Aug. 19, 1947. S. N. WIGHT ET AL 2,425,973
AIRPLANE APPROACH CONTROL SYSTEM
Filed June 16, 1945 11 Sheets-Sheet 2

INVENTORS
S.N.Wight, O.S.Field
and N.B.Coley
BY Neil A. Preston,
THEIR ATTORNEY

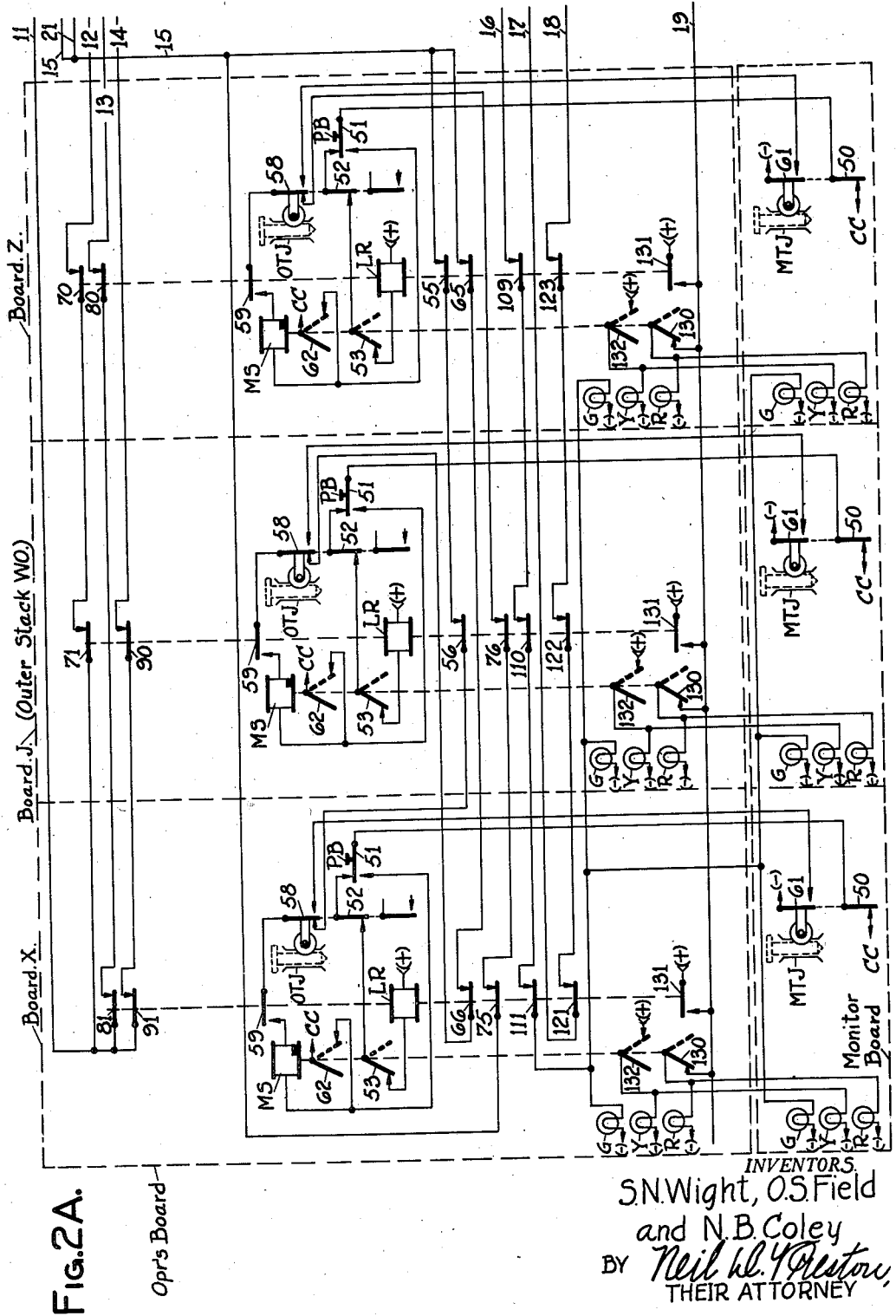

Aug. 19, 1947.     S. N. WIGHT ET AL     2,425,973
AIRPLANE APPROACH CONTROL SYSTEM
Filed June 16, 1945     11 Sheets-Sheet 6

FIG. 2C.

INVENTORS
S. N. Wight, O. S. Field
and N. B. Coley
BY Neil W. Reston,
THEIR ATTORNEY

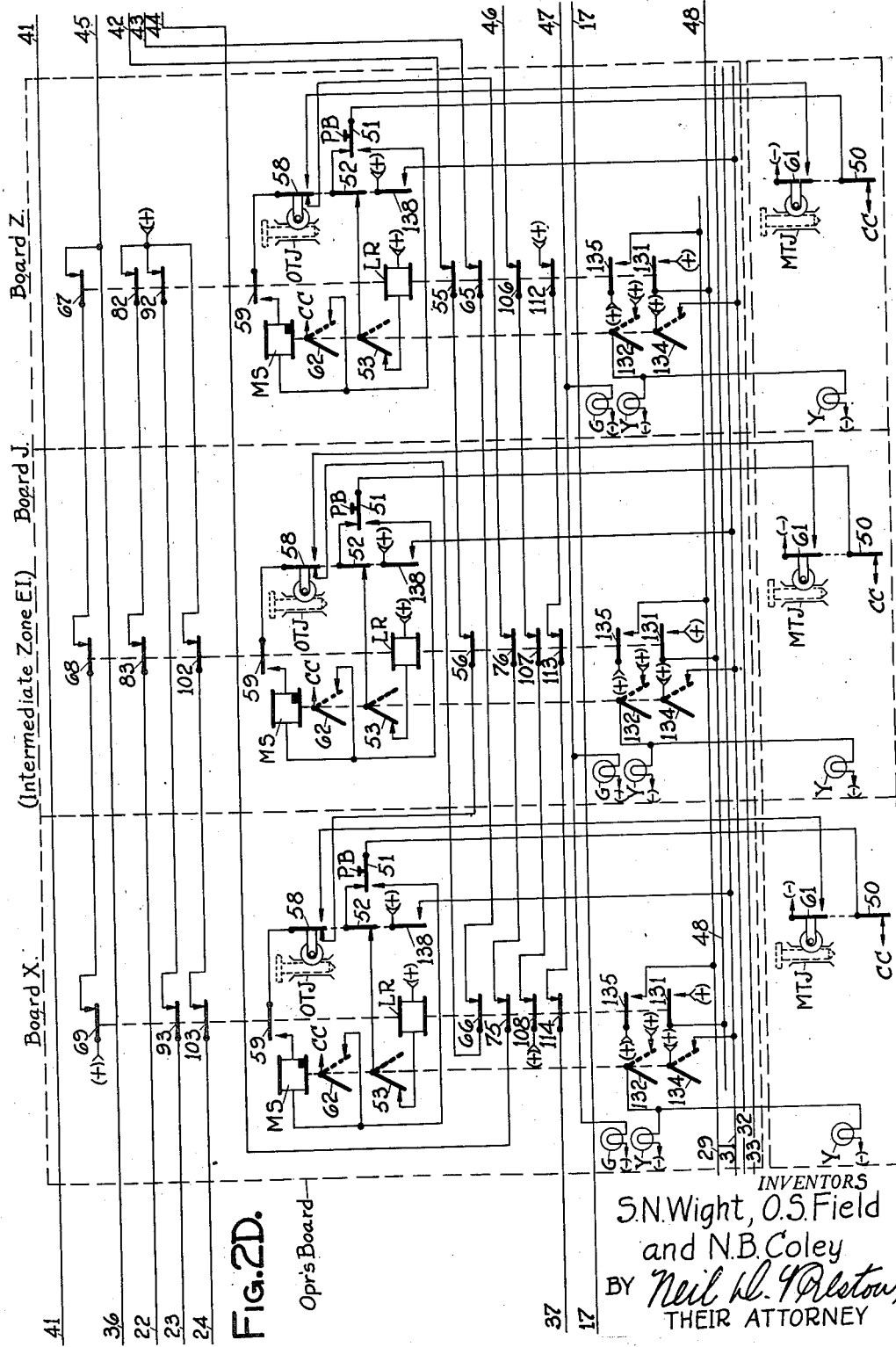

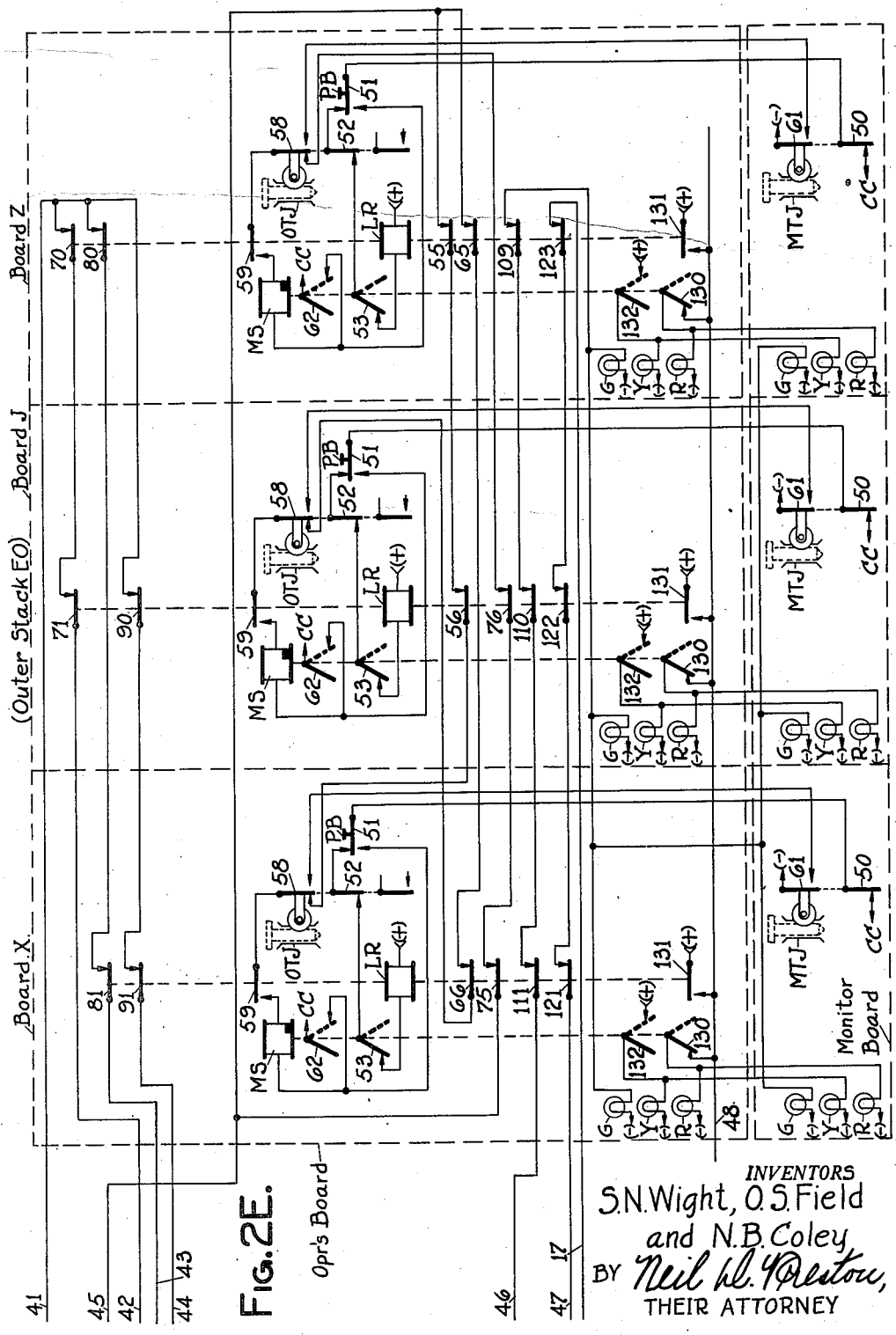

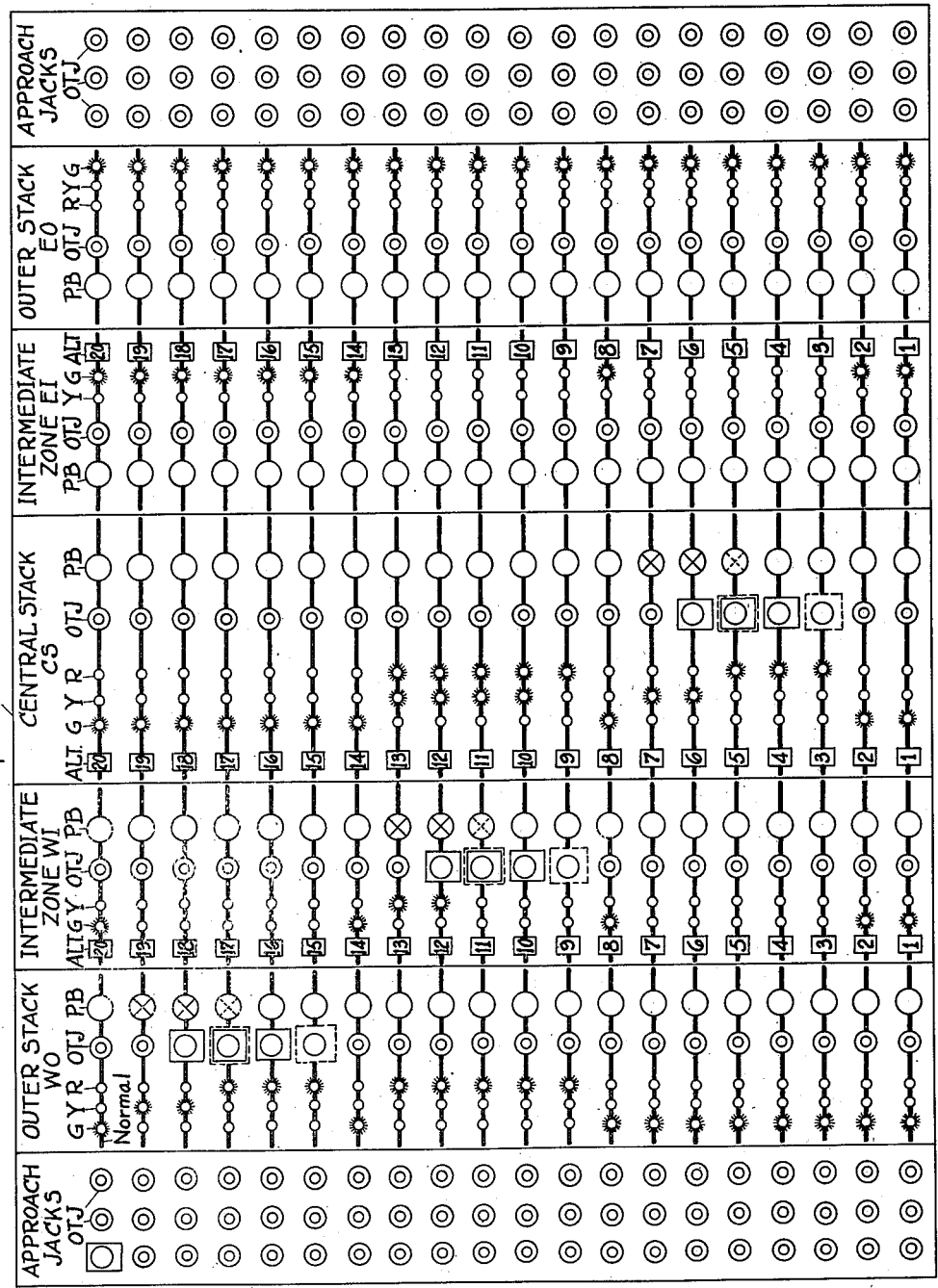

Aug. 19, 1947.　　S. N. WIGHT ET AL　　2,425,973
AIRPLANE APPROACH CONTROL SYSTEM
Filed June 16, 1945　　11 Sheets-Sheet 10

INVENTORS
S.N.Wight, O.S.Field
and N.B.Coley
BY Neil W. Preston,
THEIR ATTORNEY

Aug. 19, 1947.   S. N. WIGHT ET AL   2,425,973
AIRPLANE APPROACH CONTROL SYSTEM
Filed June 16, 1945   11 Sheets-Sheet 11

INVENTORS.
S.N.Wight, O.S.Field
and N.B.Coley
BY Neil W. Preston,
THEIR ATTORNEY Patented Aug. 19, 1947

2,425,973

UNITED STATES PATENT OFFICE 2,425,973

AIRPLANE APPROACH CONTROL SYSTEM

Sedgwick N. Wight, Oscar S. Field, and Nelson B. Coley, Rochester, N. Y., assignors to General Railway Signal Company, Rochester, N. Y.

Application June 16, 1945, Serial No. 599,854

34 Claims. (Cl. 177—353)

This invention relates to a control and indication system for indicating traffic conditions on various air routes and air route portions.

At the approach to airports it is often found necessary to store airplanes in one or more holding stacks to await their time to land. This comes about by reason of the fact that airplanes arrive over numerous altitudes over numerous traffic lanes all of which airplanes must in most instances be landed on a single landing strip one at a time and not spaced too closely.

In view of the foregoing and other considerations it is proposed in accordance with the present invention to preferably provide a plurality of like constructed control and indication boards one for each of one or more operators, each board of which is provided with controllable devices, token jacks and indicating lights, each board depicting the same route, route portions and holding stacks and to so interconnect the devices on these boards that each board will indicate traffic conditions at all points but will distinctively indicate on each board the airplanes that are to be dispatched by the operator at that board.

It is further proposed as an object of the present invention to provide means to enable a particular operator to pre-empt a portion of a route or an altitude in a holding stack for his own use which no other operator may thereafter use until the first mentioned operator's right thereto has been cancelled.

As another object of the present invention it is proposed to provide means whereby if a plurality of operators try to either pre-empt a route or stack portion, or try to hold such route or stack portion, only one of such plurality of operators will obtain rights to instruct an airplane to occupy such route or stack portion.

Another object of the present invention resides in the employment of mag-stick or similar stay-where-put relays to aid in the indication of traffic conditions so that a temporary failure of the power source will not cause the stored information to be lost as would be the case if electrical stick relays of the neutral type were used.

Another object of the invention resides in the provision of token receptacles or jacks in which tokens identifying airplanes may be inserted and each of which is provided with contacts to control circuits dependent upon whether or not there is a token in such token jack.

In accordance with another object of the present invention it is proposed to provide indicating means for each route or stack portion to indicate whether such route or stack portion is clear, has been pre-empted by the operator of that board, has been pre-empted or occupied by an operator of another board, or in combination with a token may indicate that the route or stack portion is occupied by an airplane under the control of the operator of that board. It is also proposed to accomplish such pre-empting through the medium of a self-restoring manually operable device such as a push button and means having a stick feature so that special manipulation will be required to cancel a pre-empted airway route portion.

In accordance with another object of the present invention it is proposed to provide locking means whereby an operator is unable to pre-empt a route portion or stack altitude to his own use, all other conditions being favorable, unless both his token jack and the corresponding token jack of his monitor for that route portion or stack altitude are free of tokens.

Other objects, purposes and characteristic features of the invention will be in part pointed out hereinafter and will in part be obvious from the accompanying drawings in which:

Figs. 2A, 2B, 2C, 2D and 2E show respectively the apparatus on the operator's panel and on the monitor's panel for stacks and route portions WO, WI, CS, EI and EO, respectively;

Fig. 3 shows another view of a modified operator's board X to illustrate various airway traffic conditions;

Fig. 6 illustrates the interlocking portion of the various push button controlled circuits including the various push buttons PB shown in Figs. 2A-2E but illustrating these circuits only up to and including the operator's token jack contact;

Fig. 7 illustrates the various circuits for controlling the green lamps G on both the operator's and the monitor's board and also shown in Figs. 2A-2E.

The present invention may be used with any suitable form of airplane landing apparatus or procedure but is preferably used in combination with the landing apparatus including a computer as disclosed in the prior application of Field, Wight and Hewes, Ser. No. 573,876, filed January 22, 1945.

Figure 1A:
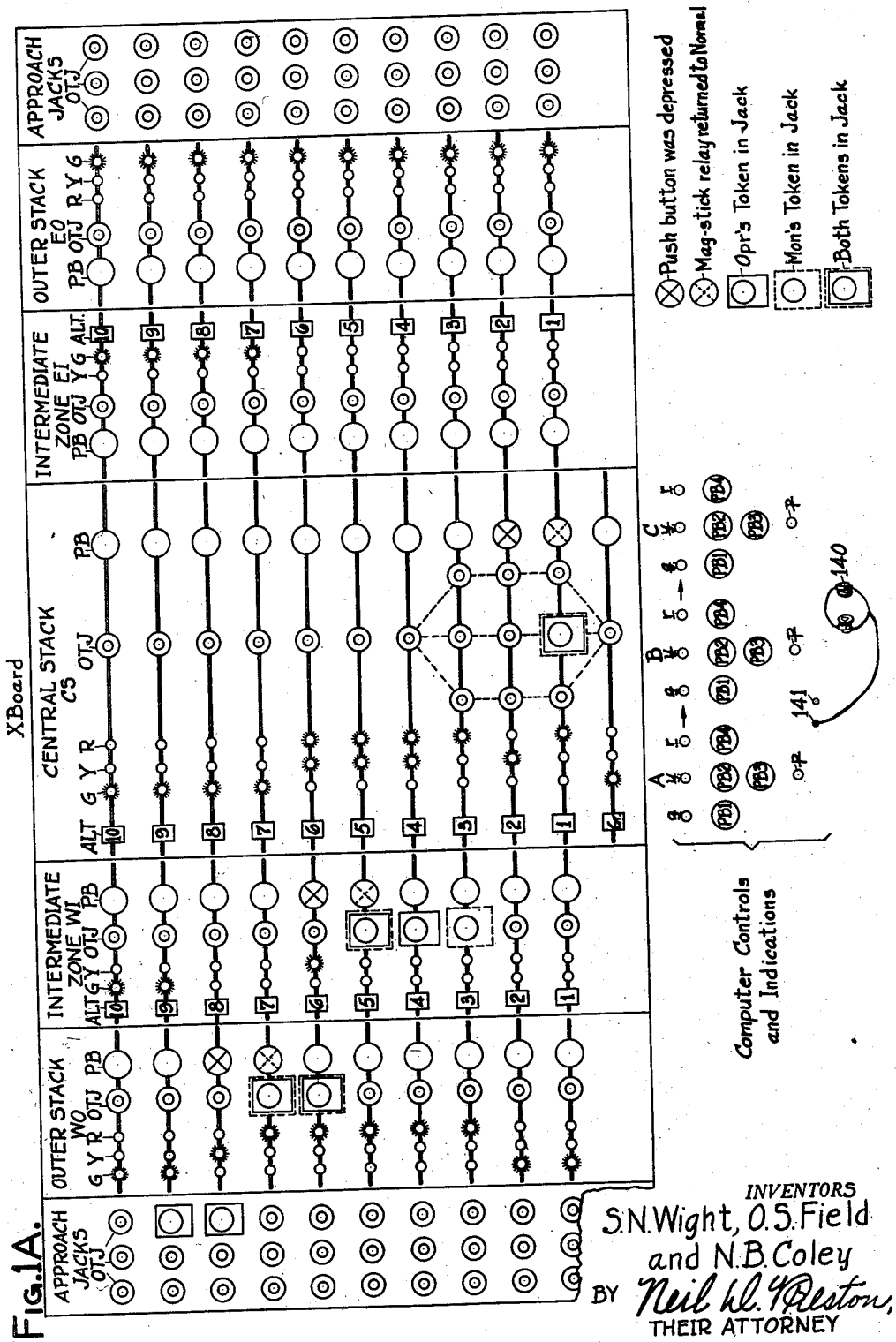
Figs. 1A, 1B and 1C show respectively the operator's or dispatcher's panels or boards X, J and Z, the monitor's panels (shown in Figs. 2A-2E) are identical except for the omission of all the push buttons and for the omission of indicating lights R from the intermediate zones WI and EI.

*Structure.*—Referring to Fig. 1A it will be seen that the central panel of the operator's or dispatcher's board depicts the central holding stack CS (see Fig. 4) in which airplanes may be held at various altitudes, ten altitudes 1 to 10, inclusive, of which have been conventionally depicted on the panel, suitable indicators and apparatus for the ground level also having been illustrated. Similarly, the apparatus for outer stacks WO and EO (see Fig. 4) have been illustrated as have also the apparatuses for intermediate zones WI and EI. It will be seen that each of these panel portions is provided with both a push button PB and a token jack OTJ for each altitude except that altitudes 1, 2, and 3 for the central stack have been provided with three token jacks each. It will also be seen that each altitude for each stack WO, CS and EO has been provided with three indicating lamps G, Y and R whereas the panels for intermediate zones WI and EI have been provided only with indicating lamps G and Y. Three approach token jacks have been illustrated for each altitude of outer stacks WO and EO but these token jacks are not provided with contacts and are merely used as a means for supporting a token at a suitable location, such token having been illustrated in detail in Figs. 5A and 5B. The boards for operator's J and Z, illustrated in Figs. 1B and 1C respectively, are identical to the board illustrated in Fig. 1A and for this reason like elements have been designated by like reference characters. In this connection it may be pointed out that each device identified by a reference character will be further characterized by designating the particular panel on which the device is located. Each altitude is designated by its number on a small plate under the heading ALT.

Figure 1B:
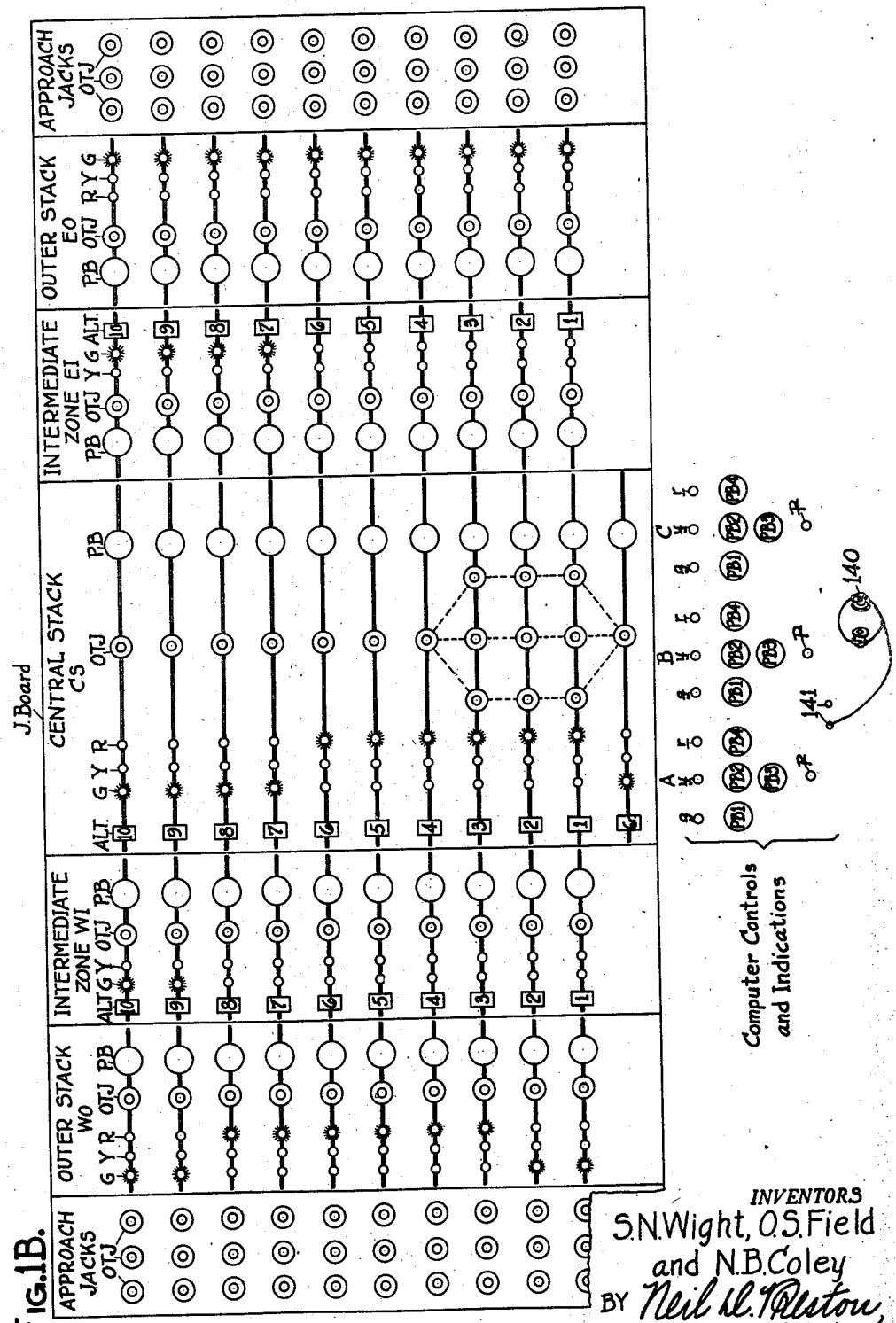
Figure 1C:
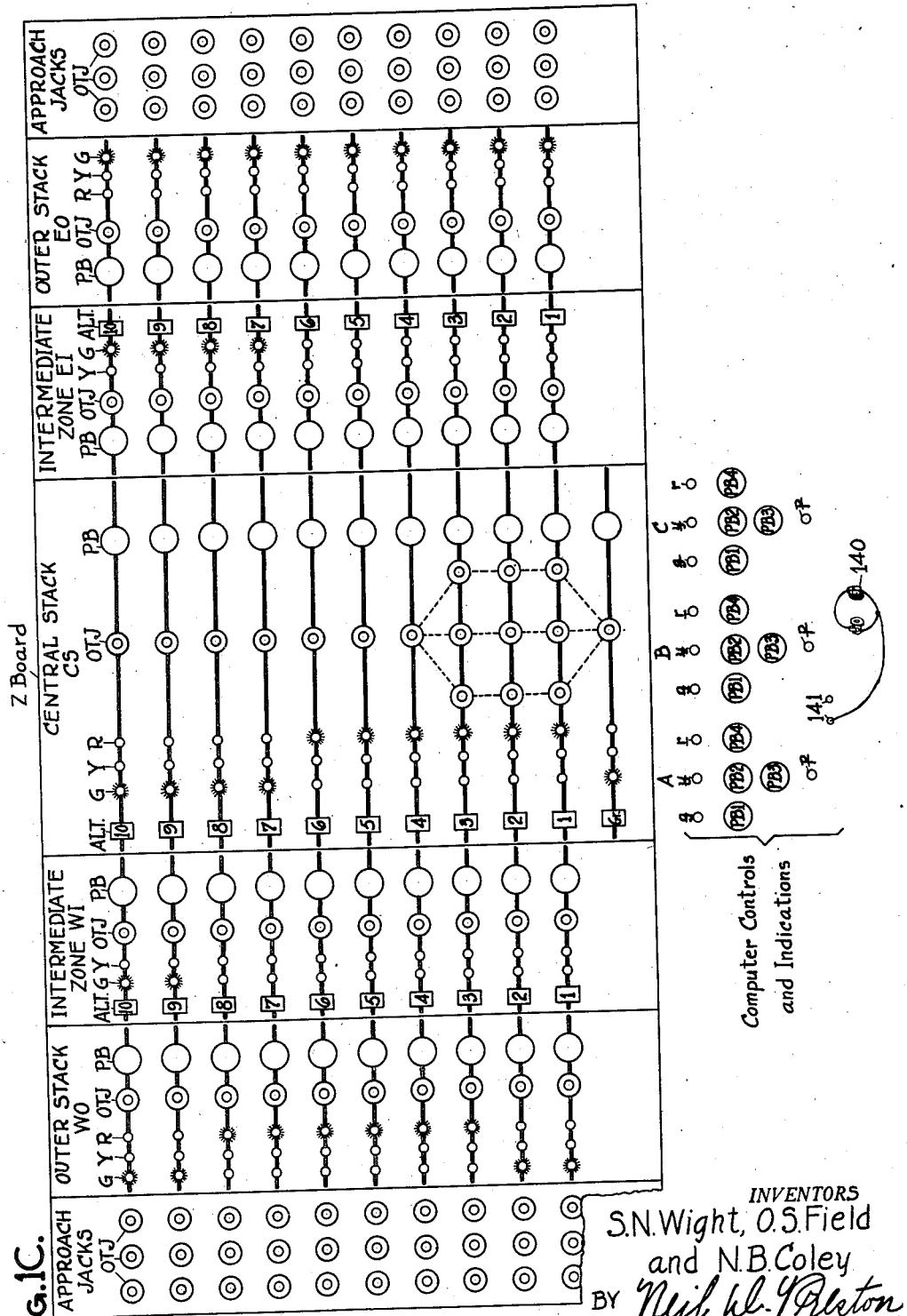
Figure 2B:
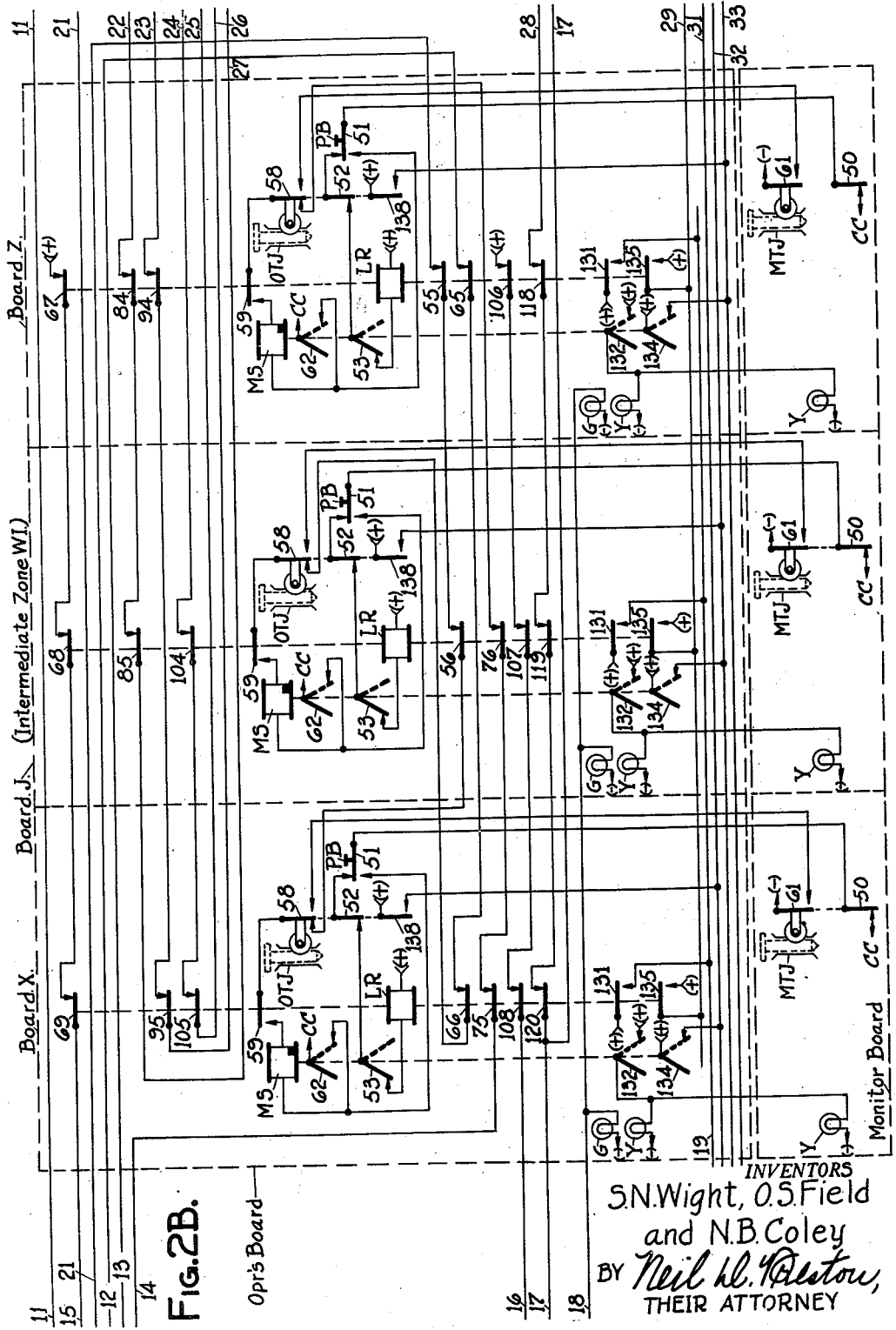
Figure 4:
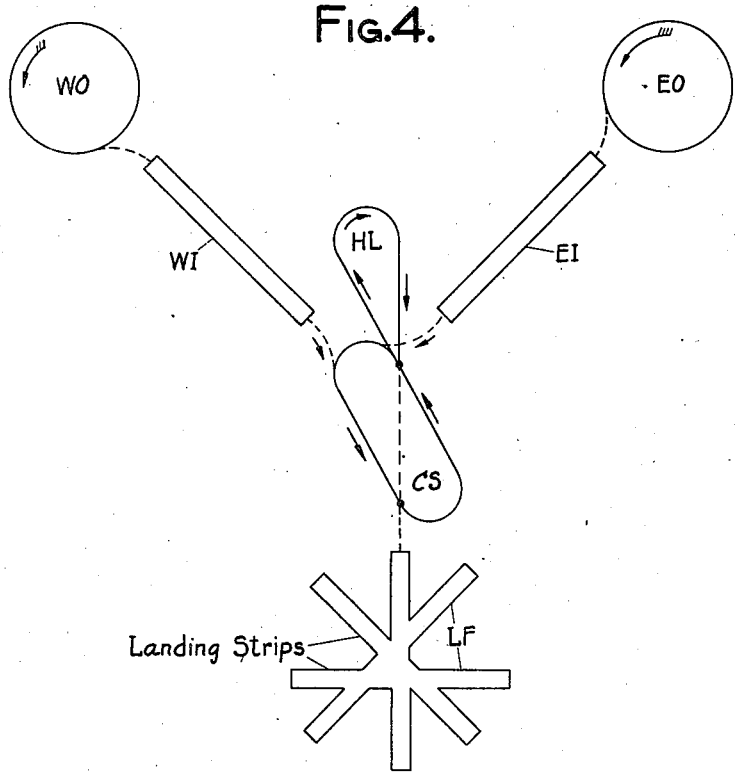
Fig. 4 illustrates a ground plan for one arrangement of central stack CS, outer stacks WO and EO, and intermediate zones WI and EI.

Referring now to Figs. 2A–2E of the drawings, it will be seen that Fig. 2A illustrates the apparatus located on both the dispatcher's and the monitor's control board associated with the outer stack WO; Fig. 2B shows the apparatus associated with the intermediate zone WI; Fig. 2C illustrates the apparatus associated with the central stack CS; Fig. 2D illustrates the apparatus associated with the intermediate zone EI; and Fig. 2E shows the apparatus associated with the outer stack EO for one altitude of both the dispatcher's panels and the monitor's panels. The ground layout for these stacks and zones are shown in Fig. 4. As shown, the apparatus associated with the dispatcher's or operator's panel is illustrated in the upper part in each one of these drawings (Figs. 2A–2E) whereas the apparatus associated with the monitor's panel is illustrated in the lower part of each of these drawings. In this connection, it should be noted that, for the purpose of simplifying the circuits illustrated the apparatus and circuits located on boards X, J and Z respectively, for the outer stack WO have been illustrated in one drawing (Fig. 2A) whereas these portions for operators X, J and Z of the operator's boards for outer stack WO have been illustrated in different drawings, namely, in the drawings of Figs. 1A, 1B and 1C respectively. Had the apparatus illustrated in the circuit diagrams of Figs 2A–2E been segregated with all of the apparatus for board X on one drawing, all of the apparatus for board J on another drawing, an extremely large number of wires would have been necessary to connect these drawings and for this reason the drawings have been simplified as illustrated in Figs. 2A to 2E, inclusive.

It is desirable to use push buttons which are spring returned and which need be only momentarily operated to manifest certain actions by the operator. In order to maintain an indication that such momentary operation has taken place it is necessary to use a suitable hold-over device such as a neutral stick relay or a mag-stick relay, so that the relay will remain in its last operated position. Since a neutral stick relay is maintained energized through a stick circuit including its own front contact and is biased away from the energized position, any momentary power failure if such neutral relay were used would cause all of such relays to drop to their deenergized position as a result of which any manifestation of previous momentary push-button operation would be lost upon each power failure, for which reason mag-stick relays MS have been provided. These mag-stick relays MS remain in their last actuated position irrespective of power failures.

In order to provide suitable interlocking between different operator's boards X, J and Z and between different route portions WO, WI, CS, EI and EO lock relays LR have been provided and these lock relays are controlled in conjunction with the token jacks, push buttons and mag-stick relays already described. Since the mag-stick relays MS and the lock relays LR are controlled in like manner on all of the fifteen panel boards illustrated in Figs. 2A to 2E, inclusive, especially insofar as the circuit portion on each of these panels is concerned, these circuit portions will be described for the board X of outer stack WO and like portions of all corresponding circuits on other panels will be assigned like reference characters.

The wires extending from Fig. 2A to Fig. 2B have been assigned reference numbers 11, 12, 13, 14, 15, 16, 17, 18 and 19. The wires extending from Fig. 2B to Fig. 2C have been designated by reference numbers 11, 17, 21, 22, 23, 24, 25, 26, 27, 28, 29, 31, 32 and 33. The wires extending from Fig. 2C to Fig. 2D have been identified by reference numbers 17, 22, 23, 24, 29, 31, 32, 33, 36, 37 and 41. The wires extending from Fig. 2D to Fig. 2E have been identified by reference numbers 17, 41, 42, 43, 44, 45, 46, 47 and 48.

Referring to board X (Fig. 2A) it will be seen that the lock relay LR is normally energized through a circuit beginning at the mid-point CC of a suitable source of current, and passing through contact 50 of the monitor's token MTJ on the monitor's board X, stack WO, push button contact 51 on the operator's board X of this same outer stack, token contact 52 of the token jack OTJ on the operator's panel, contact 53 of the mag-stick relay MS, operator's board X, winding of the lock relay LR, board X, outer stack WO, to another terminal (+) of this same source. If now the operator depresses his push button PB, board X, outer stack WO (Fig. 2A), this circuit is broken and a circuit is prepared from the terminal (+) of a suitable source of current through suitable interlocking contacts more specifically described hereinafter (see Fig. 6) and through front contact 55 of the lock relay LR, board Z, outer stack WO (Fig. 2A), front contact 56 of the lock relay LR, board J, outer stack WO, (Fig. 2A), contact 58 of the operator's token jack OTJ, board X, outer stack WO, back contact 59 of the lock relay LR, board X, outer stack WO, winding of the relay MS, normally open contact 51 of push button PB, board X, outer stack WO (Fig. 2A), contact 50 of the associated monitor's token jack, to a center tap CC of said source of current. It will be seen that the circuit just traced is open at back contact 59 of the lock relay LR. As just pointed out depression of the push button PB, board X (Fig. 2A) caused opening of its normally closed contact 51 and thereby caused deenergization of the lock relay LR for this panel WO of board X. This results in the closure of back contact 59 so that the prepared circuit just traced for the mag-stick relay MS is completed and causes operation of this mag-stick relay MS from its left-hand to its right-hand position. It will be seen that this operation of the mag-stick relay MS, board X (Fig. 2A) causes the green light G on this panel X (Fig. 2A) to be extinguished and the associated yellow light Y to be energized. The green lights G on panels J and Z (Fig. 2A) are also extinguished but their associated yellow lights are not lighted. Their red lights R will, however, be lighted. It is readily seen that had the operator inserted a token in the token jack OTJ, the lock relay LR would also have been deenergized as would also have been the case had the monitor inserted a token in his token jack MTJ for this outer stack WO, board X (Fig. 2A).

If now the operator and the monitor each insert a token in their token jack for panel WO, board X, all for reasons pointed out hereinafter, a circuit is closed for returning the mag-stick relay MS of this same board back to its normal left-hand position which may be traced as follows: starting at the terminal (—) of a suitable source of current, contact 61 of monitor's token jack MTJ, contact 58 of the corresponding operator's token jack OTJ, panel of outer stack WO, board X (Fig. 2A), assuming its right-hand position because there is presumed to be a token now inserted in this token jack OTJ, back contact 59 of the lock relay LR, winding of the mag-stick MS, normally open contact 62 of mag-stick relay MS, board X (Fig. 2A) to the mid point CC of said source of current. It will be observed that current now flows in the opposite direction through the mag-stick relay MS from that which flowed therein when the circuit for this mag-stick relay was traced through the normally open contact 51 of push button PB. For this reason the mag-stick relay MS is operated from its right-hand to its left-hand position to cause the yellow light Y to be extinguished and the red lamp R to be lighted. The circuit just traced is opened at contact 62 as soon as the relay has been operated beyond its middle position. For reasons already pointed out like elements for the boards J and Z of outer stack WO and for boards X, J and Z for each of the stacks CS and EO and each of the zones WI and EI will be assigned like reference characters except that lock contacts 55 and 56 will be designated 65 and 66 for circuits associated with board J and will be designated 75 and 76 for circuits associated with board Z.

By referring to the fifteen panels illustrated in Figs. 2A to 2E, inclusive, it will be seen that each of the push buttons PB has associated therewith a contact 51 which has two active positions that each of the operator's token jacks OTJ has associated therewith a normally closed contact 52 and a double throw contact 58 and that each of the monitor's token jacks MTJ, located on the monitor's board, is provided with a normally closed contact 50 and a normally open contact 61. By studying the circuits on the panel X (Fig. 2A), for instance, it is readily seen that the lock relay LR is normally energized signifying normal conditions. It is also readily seen that with the mag-stick relay MS to the left signifies normal conditions and that this relay when assuming the right-hand position signifies that the associated push button has been operated and that this has not yet been followed by the insertion of a token in each of the token jacks OTJ and MTJ on the board X (Fig. 2A). It is also readily seen that if either token is inserted in its token jack OTJ or MTJ, board X (Fig. 2A), or if both of such tokens are inserted before the associated push button PB is operated that the lock relay LR will assume its deenergized position. It is also readily seen that if the mag-stick relay MS is once operated to its abnormal right-hand position that it cannot be restored unless a token is inserted in each of the token jacks OTJ and MTJ for that panel in overlapped relation and that thereafter the lock relay LR will be picked up only if both of these tokens are again removed. It will also be seen that if there is a token in either or both of the token jacks OTJ or MTJ that depression of the associated push button PB will produce no result. The manner in which these various functions may be used to control indicating lights on the same and on other panels of the various control and indication boards will be more fully discussed when the operation of the system by one or more operators and monitors is considered hereinafter.

*Ground layout.*—In Fig. 4 has been illustrated a ground plan or ground layout including circular outer stacks WO and EO, the letters W and E signifying west and east, respectively, an oblong central stack CS and intermediate zones WI and EI connecting the outer stacks WO and EO, respectively, to the central stacks CS. As illustrated the central stack CS has associated therewith a holding loop HL with the understanding that this particular type of central stack and holding loop will be used when the invention is practiced in connection with the landing apparatus illustrated in the prior application, Ser. No. 573,876, above referred to. When this landing system is used airplanes are called from the central stack CS one at a time and are instructed to make external holding loop maneuvers in the holding loop HL which may be of various lengths depending upon the length of time to be dissipated before an actual approach toward a runway of the landing field LF illustrated in Fig. 4 is permitted. These maneuvers may be made in overlapped relationship. It should be understood that other configurations of central stack CS and outer stacks WO and EO, than those illustrated, may be employed if desired. The intermediate zones WI and EI are merely lines for connecting outer stacks to the central stack and preferably do not include any particular ground equipment. The central stack and outer stacks are, however, preferably marked in any suitable way as by radio beacons or aerophares and detected by suitable means such as an automatic direction finder through the medium of which the pilot may be guided when flying blind as in a heavy overcast of fog or mist.

*Push-button circuits.*—In Fig. 6 of the drawings have been illustrated circuits to show how the push-button partial circuit for controlling a particular mag-stick relay on a particular panel are interlocked with lock relay contacts located on that and other panels of the circuit diagram (Figs. 2A–2E). These interlocked circuits are not shown in their entirety but are merely shown up to and including the token contact 58 (see board X, Fig. 2A).

Referring now to Fig. 6, the contact 58 for board X, outer stack WO (Fig. 6) receives its energy from a terminal (+) of a suitable source of direct current, front contact 67 of the lock relay LR, board Z, intermediate zone WI, front contact 68 of the lock relay LR for board J, and contact 69 of the lock relay LR of board X, intermediate zone WI, through wire 15, front contact 55 of the lock relay LR of board Z, outer stack WO, front contact 56 of lock relay LR of board J of outer stack WO to the token jack contact 58, from whence the circuit continues and may be traced on Fig. 2A of the drawing through back contact 59 of the lock relay LR of board X, outer stack WO, through the winding of the associated mag-stick relay MS for that board, through push-button contact 51 of the push button PB and through contact 50 of the token jack MTJ of this same board X, outer stack WO, to the center connection CC of said suitable source of direct current. A similar circuit may be traced to the token jack contact 58 for outer stack EO and for this reason corresponding contacts of symmetrically related lock relays have been assigned similar reference characters.

A circuit may be traced to the token jack contact 58 of board X, intermediate zone EI (Fig. 6) from the same terminal (+) of said suitable source of current, contacts 67, 68 and 69 of lock relays for boards Z, J and X, respectively, of zone WI, wire 21, front contacts 96, 97 and 98 of lock relays for boards X, J and Z, respectively, of the central stack CS (Fig. 6), wire 41, front contacts 70 and 71 of lock relays LR of board Z and J respectively for outer stack EO, wire 42, front contacts 55 and 56 of the lock relays LR for boards Z and J, respectively of the intermediate zone EI, to the contact 58 of the operator's token OTJ, board X, intermediate zone EI from whence the tracing of the circuit may be continued on Fig. 2D of the drawings. The contacts for the circuit for token jack contact 58 of board J, intermediate stack EI, which correspond to the contacts 70 and 71 just mentioned will for convenience be designated 80 and 81 and similarly corresponding contacts for the circuit leading to token contact 58 for board Z of intermediate zone EI will for convenience be designated 90 and 91. For the sake of uniformity and simplicity corresponding contacts for the push-button circuits for the intermediate zone WI will be designated by like reference characters as those for intermediate zone EI except that the contacts 96, 97 and 98 at the central stack for the circuits leading to the intermediate stack EI will be replaced by contacts 86, 87 and 88 respectively. The circuit leading to the token jack contact 58 for board X of the center stack CS (Fig. 6) may be traced from the terminal (+) of a suitable source of current, front contacts 82 and 83 of the lock relays LR for boards Z and J respectively for intermediat zone EI, wire 22, front contacts 84 and 85 of the lock relays LR, boards Z and J respectively for intermediate zone WI, wire 27, front contact 55 of the lock relay LR for board Z, central stack CS, front contact 56 of the lock relay LR for the board J of the central stack to the token jack contact 58 from whence the tracing of the circuit may be continued on Fig. 2C of the drawings as already traced hereinbefore on Fig. 2A. In like manner the contacts for circuits leading to the token jack contact 58 and board J for the central stack CS and corresponding to contacts 82, 83, 84 and 85 just mentioned have for convenience been designated 92, 93, 94 and 95 respectively, and for board Z have been designated 102, 103, 104 and 105, respectively. All of these circuits may be traced in full in Figs. 2A–2E of the drawings.

*Green-light circuits.*—In Fig. 7 of the drawings have been illustrated the circuits for the green lights of Figs. 2A to 2E inclusive. It will be seen that the circuits for the three green lights G for both the operator's board and the monitor's board for outer stack WO are subject to front contacts of the six lock relays associated with outer stack WO and intermediate zone WI. The circuit for these green lights may be traced from the terminal (+) of a suitable source of current through front contacts 106, 107 and 108 of lock relays LR for boards Z, J and X respectively, of intermediate zone WI, wire 16, front contacts 109, 110 and 111 respectively, of lock relays LR on boards Z, J and X respectively, of outer stack WO (Fig. 7) through these lights G on both the operator's and the monitor's board to the other terminal (−) of this source of current. Since the green light G for the panel boards X, J and Z of outer stack EO are controlled by similar circuits corresponding contacts have been designated by like reference characters. It will also be seen that the circuits for the green lights G for the central stack CS (Fig. 7) are subject to front contacts of the nine lock relays located at the central stack CS and intermediate stacks WI and EI and also include wires 37, 28 and 17. These contacts have been designated 112, 113, 114, 115, 116, 117, 118, 119 and 120. It will be seen that the circuit including these contacts 112–120 also fed energy to the green lights G for intermediate stacks WI and EI through wires 18 and 47 respectively but that these green lights include contacts of additional lock relays located at outer stacks WO and EO. These additional contacts have been designated 121, 122 and 123. These circuits may also be traced in Figs. 2A–2E of the drawings. All of these circuits in Figs. 2A–2E are obviously duplicated for each of the ten altitudes illustrated in Figs. 1A, 1B and 1C of the drawings.

Figure 5A:
Figs. 5A and 5B illustrate a front view and a side elevation, respectively, of the tokens employed on the operator's and the monitor's boards.
Figure 5B:
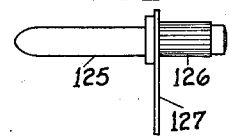

*Operation by one operator and one monitor.*—As already pointed out tokens are used as symbols to signify airplanes and the location of such a token on the operator's or monitor's board signifies that the airplane it identifies is assigned to that route portion or stack altitude. Referring to Figs. 5A and 5B it will be seen that this token constitutes a peg or shank 125 provided with knurled handle 126 over which a perforated card 127 may be pushed, the knurling on the handle 126 serving as a means for preventing the rotation of the card about the token handle. This card is preferably provided with data identifying the airplane and possibly its cargo or destination and/or the pilot of the airplane.

Referring now to Fig. 4 of the drawings let us assume that an airplane numbered 100 is approaching the outer stack WO (Fig. 4) at a particular altitude which is not important to the present consideration. The operator will prepare a token by inscribing the airplane number and other data on the card 127 of a token and will insert the token in one of the three rows of approach jacks shown at the extreme left-hand side of Fig. 3 of the drawings. For the present, consideration will be given only to the board at which the operator is located, that is, it will be assumed that only one operator is present by reason of low traffic density, and let us for this purpose refer to Fig. 3 of the drawings.

In both Figs. 3 and 1A, 1B and 1C of the drawings a cross on a push button PB denotes that the push button has been depressed and two tokens have not yet been inserted and removed (see legend "push button was depressed"). That is, it denotes that a mag-stick relay MS, fifteen of which are shown in Figs. 2A–2E of the drawings, has been operated to its abnormal right-hand position. A dotted cross in such push button denotes that the mag-stick relay MS was just returned to normal by both tokens being inserted but not yet removed (see legend "mag-stick relay returned to normal"). A solid rectangle about a token jack is a symbol to indicate that the operator's token is in place ("Oprs. token in jack"). A dotted rectangle about a token jack signifies that the monitor's token is contained in the corresponding token jack ("Mon's token in jack"). A solid rectangle and also a dotted rectangle about a token jack signifies that both an operator's token and a monitor's token are located in their respective corresponding token jacks ("both tokens in jack").

The monitor who is located at a monitor's board, preferably located in a different room than that in which the operator's board is located, will also prepare a token identifying this airplane 100, and he will insert it in one of the approach token jacks located to the extreme left on his board (Figs. 2A–2E).

Let us assume that the airplane 100 under consideration is approaching the outer stack WO and that the operator decides to have this airplane enter the outer stack WO at a particular altitude. Before he can do this he must preempt, or set aside, a particular altitude for his own use. In order to do this he will depress a push button PB on the panel for the outer stack WO, as for instance indicated by the cross on push button PB for altitude 19 meaning 19000 feet (Fig. 3). This will result in the lighting of the yellow light Y for stack WO for the particular altitude under consideration and in the extinguishment of the green light G as illustrated for altitude 19 of Fig. 3. It should be understood that all of the operations presently considered occur at one altitude only but the conditions of the board will be shown at various altitudes in Fig. 3 of the drawings. To accomplish this lighting of the yellow light Y let us assume that the operator depresses the push button PB, board X (Fig. 2A), as a result of which the following circuit for the mag-stick relay MS is closed; beginning at the terminal (+) of a suitable source of current front contacts 67, 68 and 69 of lock relays LR for boards Z, J and X respectively, for the intermediate zone WI (Fig. 2B), wire 15, front contacts 55 and 56 of lock relays LR for boards Z and J respectively of outer stack WO (Fig. 2A), contact 58 of the token jack OTJ, back contact 59 of the lock relay LR (this lock relay having been dropped by the opening of contact 51 of the depressed push button PB), winding of the mag-stick relay MS of board X (Fig. 2A), normally open contact 51 of the push button PB and contact 50 of the monitor's token jack MTJ, board X (Fig. 2A) to the mid point CC of said source of current. The completion of this circuit will cause this mag-stick relay MS to be operated to its right-hand position to thereby cause opening of the contact 130 of the mag-stick relay MS so that the closing of back contact 131 of the associated lock relay LR cannot energize this red light R and it will also result in the closure of contact 132 of this mag-stick relay to light the yellow light Y (see altitude 19 for outer stack WO, Fig. 3). By referring to Fig. 2A it will be observed that opening of front contacts 111 and 124 of lock relay LR extinguished the green lights G not only for board X of the outer stack WO (Fig. 2A) but also for board X of the intermediate zone WI (Fig. 2B) as is also evident by reference to altitude 19 of Fig. 3 of the drawings. Corresponding contacts 131 and 132 on the three panel boards X, J and Z for outer stacks WO and EO and for intermediate stacks WI and EI have been designated by like reference characters and contacts for outer stacks WO and EO corresponding to contact 130 of panel X of Fig. 2A have also been designated by like reference characters.

Referring now to altitude 18 (Fig. 3) let us assume that the operator inserts his token 100 in the token jack OTJ for the panel X of the outer stack WO (Fig. 2A). As is evident from the circuits of Fig. 2A and as indicated in Fig. 3 this will produce no change in the indicating lights. Referring to Fig. 2A such insertion of the token 100 in the token jack OTJ, board X, results merely in the opening of the contact 52 in the circuit of the lock relay LR which is already open and results in the breaking of the circuit heretofore traced for the mag-stick relay MS and in the preparation of a second circuit for this mag-stick relay MS which is open at another point.

Referring now to altitude 17 (Fig. 3) let us assume that the operator has instructed the pilot to enter outer stack WO at a particular altitude and that the monitor also inserts his token in the token jack MTJ, board X, (Fig. 2A), because he has heard the pilot of the airplane 100 acknowledge that he will enter the specified altitude of stack WO in response to instructions from the operator or dispatcher. In this connection it is desired to again point out that the monitor can only hear the voices of pilots by reason of the fact that even though the same carrier frequency is employed the operation of a foot pedal in the radio telephone system by the operator which operation is necessary to enable him to send a verbal radio message to the pilot also results in cutting off the monitor's radio telephone so that the monitor cannot hear the operator speak. This construction or other construction producing a similar result, is resorted to so that the monitor's action of inserting a token in the token jack is entirely in response to what he hears the pilot say and this will result in a check upon the fact that the pilot has properly heard, properly interpreted and properly repeated back the instructions given to him by the operator. That is, if the pilot reports entering, for instance, a different altitude than the altitude which he was instructed to enter by the operator, the monitor will insert his token in a token jack not corresponding to the token jack in which the operator has inserted his token and the desired indications on the board will not appear.

Let us now assume that the monitor inserts his token in the token jack MTJ, board X (Fig. 2A), the operator already having inserted his token in the token jack OTJ of the same board (see altitude 17, Fig. 3). A circuit is now closed which may be traced from the (—) terminal of the source of current above mentioned, contact 61 of token jack MTJ, board X (Fig. 2A), contact 58 of token jack OTJ assuming its right-hand position back contact 59 of the lock relay LR for the same board, mag-stick relay MS, contact 62 of this mag-stick relay MS assuming its right-hand position and to the midpoint CC of said source of current. It will be observed that the current flow in this circuit is of opposite polarity from that which flowed in the first circuit traced for this mag-stick relay MS for which reason this mag-stick relay MS will be operated back to its original left-hand position. With the contact 139 of the mag-stick relay MS again assuming its left-hand position an energizing circuit for the red light R, board X, outer stack WO (Fig. 2A) will be lighted and the associated yellow light Y will be extinguished by the opening of contact 132 as indicated for altitude 17 in Fig. 3 of the drawings. The fact that the mag-stick relay MS has been returned to its normal position is indicated by the dotted cross in push button PB, altitude 17 (Fig. 3).

Referring now to altitude 16 (Fig. 3) it will be seen that only the monitor's token has been removed. This, however, produces no change in the indicating lights for altitude 16 as compared with the indications displayed for altitude 17 in Fig. 3 of the drawings. In altitude 15 (Fig. 3) only the operator's token is shown removed and this also produces no change in the indicating lights as is obvious from the circuits shown in Fig. 2A. If, however, both of these tokens are removed from the token jack of board X (Fig. 2A) the green lights G (see altitude 14 of Fig. 3) will again be lighted because the lock relay LR (see board X, Fig. 2A) is again reenergized through its original energizing circuit heretofore traced and including contact 50 of the token jack MTJ, and contact 52 of the token jack OTJ. This also results in the lighting of the green light G for board X of the intermediate zone WI as is obvious from Fig. 7 of the drawings.

Let us now assume that the operator wishes to allow this airplane 100 to move into the same or a different altitude of the central stack CS (Figs. 3 and 4). In order to do so since the green light G for the central stack for a particular altitude is lighted, the green light for the intermediate zone (see altitude 13, Fig. 3) being extinguished, he will depress the push button PB for the intermediate zone WI for that altitude. This has been illustrated in altitude 13 in Fig. 3 of the drawings. In the event a change in altitude is to be made in flying from the outer stack WO to the central stack CS the operator will be required to depress all of the intervening push buttons for the intermediate zone including those of the exited and entered altitudes and he must receive a lighted yellow light for each of these altitudes before he may instruct a pilot to make such entrance into a new altitude into central stack CS. As the pilot, after having been instructed to make a change in altitude in flying to the central stack, reports arriving at a new altitude both the monitor and the operator move their tokens accordingly from altitude to altitude in the intermediate zone. Also, as the pilot reports entering the central stack the monitor and pilot both move their tokens to the proper altitude in the central stack. Depression of the push button PB for the intermediate zone WI above mentioned causes a circuit to be closed for mag-stick relay MS, board X (Fig. 2B) which may readily be traced in Fig. 6 and Figs. 2A-2D of the drawings by starting at the terminal (+), front contacts 69, 68 and 67 of lock relays for boards X, J and Z, intermediate zone EI (Fig. 2D), wire 36, front contacts 88, 87 and 86 of boards Z, J and X for the central stack CS (Fig. 2C), wire 11, front contacts 71 and 70 of lock relays LR for boards J and Z of outer stack WO (Fig. 2A), wire 12, front contacts 55 and 56 of lock relays LR for boards Z and J, respectively, of the intermediate zone WI (Fig. 2B), contact 58 of the token jack OTJ, board X (Fig. 2B), back contact 59 of the associated lock relay LR, winding of the associated mag-stick relay MS, normally open push button contact 51 of the push button PB for board X (Fig. 2B), contact 50 of the monitor's token jack MTJ, board X (Fig. 2B), to the midpoint CC of said source of current. The closure of this circuit will cause the mag-stick relay MS for board X of intermediate zone WI (Fig. 2B) to be operated to its right-hand position to thereby light the yellow light Y for the intermediate zone WI as illustrated for altitude 13 in Fig. 3 of the drawings. This operation of the mag-stick relay MS for board X of intermediate zone WI (Fig. 2B) to its right-hand position by the closure of its contact 134 will also cause (+) energy to be applied to bus wire 31 to thereby cause the yellow light for board X of the central stack CS to be lighted through contact 132 of the associated mag-stick relay MS assuming its normal left-hand position. For this reason the yellow lamp Y in both the intermediate zone WI and at the central stack CS (see altitude 13, Fig. 3) will be lighted. The red light R for board X at the central stack CS is also lighted through a circuit including the back contact 135 of the lock relay LR for board X, intermediate zone WI (Fig. 2B), bus wire 29 and contact 136 of the mag-stick relay MS, board X, central stack CS, assuming its left-hand position. Although in practice the red light R for the outer stack WO will still be lighted by reason of the presence of a token in the associated token jack, it will remain lighted if such token is removed by reason of a circuit including contact 131 of relay LR, board X (Fig. 2B), bus wire 19 and contact 139 of relay MS, board X (Fig. 2A). These lights Y and R have been shown lighted for altitude 13 (Fig. 3). For convenience corresponding contacts 134 and 135 on panels in Figs. 2B and 2D of the drawings have been designated by like reference characters as have also contacts in Fig. 2C corresponding to contact 136.

Since the operator is confronted with lighted yellow lights (see altitude 13, Fig. 3) at both the intermediate location WI and at the central stack CS he is aware of the fact that this altitude is being held open for his use and he will then instruct the pilot on airplane 100 to enter the specified altitude. As the pilot reports back these instructions to the operator the operator will insert the token 100 in the token jack for intermediate zone WI (see altitude 12, Fig. 3), and the monitor who can only hear the pilot and not the operator will in response to this same information insert his token into the corresponding token jack on the monitor's board as conventionally illustrated for altitude 11 of Fig. 3 of the drawings. It will be observed that the insertion of the operator's token alone produced no change in the indicating lights (altitude 12, Fig. 3) but that as this was followed by the insertion of the monitor's token it resulted in the extinguishment of the yellow light for intermediate zone WI as illustrated for altitude 11 in Fig. 3 of the drawings. This extinguishment of the yellow light Y for intermediate zone WI comes about by the return of the mag-stick relay MS for board X, intermediate zone WI (Fig. 2B) to its normal position, this relay MS being returned to its normal position by the closure of a circuit including the contacts 50 and 52 of the token jacks MTJ and OTJ respectively for this same board (see board X, Fig. 2B). It is readily seen that the return of this mag-stick relay MS to its normal position by the opening of its contact 132 extinguishes the yellow light Y, board X, (Fig. 2B). The yellow light Y for board X of the central stack CS is, however, not extinguished because it is lighted through a circuit including the contact 138 of the token jack OTJ, intermediate zone WI, board X (Fig. 2B), bus wire 31, and contact 132 of the relay MS, board X, central stack (Fig. 2C). The red light R, board X, central stack CS, remains lighted through the medium of back contact 135 of lock relay LR, board X (Fig. 2B), bus wire 29 and contact 136, board X (Fig. 2C).

A token is now present in each of the token jacks OTJ and MTJ for board X, intermediate zone WI (Fig. 2B) as illustrated for altitude 11 of Fig. 3 of the drawings. This indicating condition on the board (altitude 11) assures the operator that the pilot has properly understood the operator's instructions and is following these instructions.

Let us now assume, for the purpose of discussion only, that the monitor removes his token from the token jack MTJ. This produces no change in the indicating condition of the indicating lights, as illustrated for altitude 10 as compared with altitude 11 of Fig. 3 of the drawings. This is true because merely contacts 50 and 61 of his token jack MTJ were closed and opened respectively and they are contained in circuits open at other points. Let us now assume, for the purpose of discussion only, that the monitor has left his token in his token jack MTJ but that the operator has removed his token from token jack OTJ, intermediate zone WI (Fig. 2B). It will be seen that this results in the opening of the contact 133 of the token jack OTJ which results in the extinguishment of the yellow light Y for board X, central stack CS (Fig. 2C) by opening a readily traced circuit. This is indicated for altitude 9 in Fig. 3 of the drawings. It will be seen by referring to Fig. 3 of the drawings that the red light R for outer stack WO is shown lighted for each of altitudes 9 to 13, inclusive. This is due to the fact that the red light R for panel X, outer stack WO (Fig. 2A) is lighted through a circuit including back contact 131 of the lock relay LR, board X, intermediate zone WI (Fig. 2B), bus wire 19, and contact 130 of the mag-stick relay MS for board X, outer stack WO (Fig. 2A) assuming its normal left-hand position.

If now the monitor also should remove his token from his token jack MTJ of the intermediate zone the indicating lights for outer stack WO, intermediate zone WI, and central stack CS will be returned to their normal green-light-lighted condition as illustrated for altitude 8 in Fig. 3 of the drawings.

In practice the push button PB for board X, of the central stack CS will be depressed before the tokens (see altitude 11, Fig. 3) are removed from their respective token jacks and such depression of this push button has been illustrated for altitude 7 (Fig. 3) it being assumed that the two tokens were removed after this push button was depressed. With the push button PB, board X, central stack CS (Fig. 2C) depressed a circuit is closed for the associated mag-stick relay MS which may be traced in the drawings (Fig. 6) from the terminal (+), of a suitable source of energy, front contacts 82 and 83 of lock relays for boards J and Z, intermediate zone WI (Fig. 2D), wire 22, front contacts 84 and 85 of lock relays LR for boards Z and J, intermediate zone WI (Fig. 2B), wire 27, front contacts 55 and 56 of lock relays for boards Z and J of central stack CS (Fig. 2C), contact 58 of the token jack OTJ, board X (Fig. 2C), back contact 59 of the associated lock relay LR, winding of the associated mag-stick relay MS, push button contact 51 of the associated push button PB, and contact 50 of the associated monitor's token jack MTJ to the midpoint CC of said source of current. The completion of this circuit causes the mag-stick relay MS, board X, central stack CS (Fig. 2C) to be operated to its right-hand position to thereby light its yellow light Y as illustrated for altitude 7, Fig. 3 of the drawings. It also causes the green light G for board X, intermediate to zone WI to be extinguished by the opening of front contact 117 (Figs. 2C and 7) of lock relay LR, board X, central stack CS. In practice this green light was, however, already extinguished by tokens in the token jacks of the corresponding intermediate zone. If now the pilot reports arriving at the proper altitude in the central stack CS the operator inserts his token 100 in the token jack OTJ, board X, central stack CS (Fig. 2C), no particular function (see altitude 6, Fig. 3) will be accomplished in that the circuits made and broken are open at other points, so that the yellow light Y, board X, central stack, remains lighted as illustrated for altitude 6 in Fig. 3 of the drawings. If, however, the monitor also hears this report of the pilot and inserts his token 100 in his token jack MTJ, board X, central stack CS (Fig. 2C), the associated mag-stick relay MS will be returned to its normal left-hand position and this by the opening of contact 132 will result in the extinguishment of the associated yellow light Y and the lighting of the associated red light R (see altitude 5, Fig. 3). This red light R is lighted through back contact 135 of lock relay LR, board X, central stack CS and through the contact 136 of the associated mag-stick relay MS. This condition of the apparatus has been illustrated for altitude 5 in Fig. 3 of the drawings. The green light G at both of the intermediate stacks are still extinguished by reason of open front contact 117 of relay LR, board X, control stack CS (see Fig. 7). The removal of the monitor's token alone, as in response to the pilot reporting descending to a lower altitude, produces no particular result as is obvious from the circuits described and as has been conventionally shown for altitude 4 in Fig. 3 of the drawings. Likewise, the removal of the operator's token alone, in response to such report, produces no change in the indications as indicated for altitude 3 in Fig. 3 of the drawings. If, however, both of these token are removed the red light R for board X, central stack CS (Fig. 2C) will be extinguished and the associated green light will be lighted as will also the green lights for the intermediate zones WI and EI, all as illustrated for altitude 2 in Fig. 3 of the drawings.

In the foregoing operation the indications given on boards J and Z have been substantially entirely disregarded, because it was assumed that only the operator X was present and that the indications on boards J and Z were of no importance.

We will presently consider the operation of the system when three operators conveniently called operators X, J and Z will all be present each one operating his own board similarly designated the three operators' board being preferably located side by side in one room and the three monitors' boards being preferably located side by side in another room entirely separated from the operator's room. This separation of the operators' apparatus and the monitors' apparatus is deemed necessary to obtain proper safeguards in carrying out a double check of the pilot's repeat-back acknowledgment of instructions received by him from the operator. Although the employment of a monitor and the apparatus necessary to provide such control is for safety reasons deemed desirable it should be understood that the monitors' apparatus and the functions performed thereby may be entirely omitted from the system, if desired.

*Operation by three operators and three monitors.*—It should be understood that the circuits and apparatus illustrated in Figs. 2A–2E is that apparatus necessary and associated with a single altitude on the operator's board and the monitor's board. In practicing the invention it is proposed that at least ten different altitudes will be employed, these altitudes being preferably separated 1000 feet for which reason the control boards X, J and Z illustrated in Figs. 1A, 1B and 1C respectively, illustrate ten different altitudes 1 to 10 inclusive, each number signifying 1000 feet. The circuits for each of these altitudes are identical. In addition there is provided a ground altitude GR, this ground altitude being employed to show which airplane has been granted the privilege of actually landing on the landing strip on the airfield and to show the progress of such landing. Also, although in Fig. 4 only two outer stacks WO and EO. and their associated intermediate zones WI and EI have been illustrated it should be understood that any desired number of outer stacks and associated intermediate zones may be employed.

Let us now assume that there are three operators X, J and Z at the operator's boards X, J and Z illustrated in Figs. 1A, 1B and 1C respectively, and that each operator is provided with a monitor who sits at an associated monitor's board which is identical to the operator's board except that the green lights at intermediate locations WI and EI have been omitted and that no push buttons are provided.

Referring now to board X (Fig. 1A) let us assume that the operator X wishes to bring an airplane into the outer stack WO. It is of course understood that the operators J or Z or both at boards J or Z (Figs. 1B and 1C) may be contemplating landing an airplane in this outer stack WO at the same time, in that each of the three operators has the same privilege of using all altitudes in this outer stack WO as well as in every other outer stack, such as stack EO. In order to prevent two operators attempting the entry of an airplane in this outer stack WO at the same time push buttons PB have been provided to enable an operator to pre-empt, or set aside for his own use a particular altitude in a particular outer stack. These push buttons and the associated apparatus function so that if two operators attempt simultaneously to pre-empt to themselves the same altitude neither of these operators will obtain the right to enter such altitude. This is brought about by reason of the fact that one lock relay LR must be in a de- energized position before the associated magstick relay can be operated and the corresponding mag-stick relays on the other two boards cannot be operated unless such lock relay is in an energized condition and furthermore each operated mag-stick relay holds its associated lock relay deenergized. In other words, only one of three corresponding mag-stick relays can be operated at any one time.

Let us now assume that the operator X depresses the push button PB in outer stack WO for a particular altitude, altitude 8 for instance. It will be understood that for reasons heretofore given that such depression of the push button will cause his green light G to be extinguished and his yellow light Y to be lighted for outer stack WO (Fig. 1A). Also, that the corresponding green light G for the intermediate zone WI will be extinguished all for reasons heretofore given (see altitude 8). In addition to this result on board X the corresponding green light G for outer stack WO on boards J and Z (Figs. 1B and 1C) will be extinguished and their associated red lights R will be lighted as illustrated for altitudes 8 in Figs. 1A, 1B and 1C of the drawings. The green lights G for intermediate zone WI will, however, be extinguished on all three boards (see altitude 8, Figs. 1A, 1B and 1C). Let us now observe how and through what means these green lights for outer stack WO on boards J and Z will be extinguished and their associated red lights R lighted. Referring to Fig. 2A of the drawings it will be observed that the depression of the push button PB, for board X (Fig. 2A) will result in operation of its associated mag-stick relay MS to its dotted position. This operation of this relay MS will cause the associated green light G to be extinguished and the associated yellow light Y to be lighted. Also, the opening of contact 130 of this relay prevents the red light R on panel X being lighted through a circuit including the back contact 131 of the associated lock relay but this contact 131 may feed energy over the bus wire 19 to the red lights R on panel boards J and Z for outer stack WO (Fig. 2A) and these red lights R have been illustrated lighted at altitude 8 of these boards J and Z (Figs. 1B and 1C). Also, the opening of contact 111 and 121 outer stack WO of the associated lock relay LR will cause the green lights G to be extinguished at each of points WO and WI, on all three boards (see Figs. 1A, 1B and 1C and the circuit illustrated in Fig. 7).

Referring now to altitude 7 (Fig. 1A) the insertion of the operator's token and the monitor's token in their respective token jacks on boards X (Fig. 2A) for reasons heretofore given does not change the lighting of the indicating lights on either the operator's or the monitor's boards J and Z (Figs. 1B, 1C, 2A and 2B) but merely extinguishes the yellow light for operator's and monitor's board X and lights the associated red light for the operator's and monitor's board X as illustrated at altitude 7, Fig. 1A, and as shown partly in Fig. 2A all for reasons heretofore explained. Since the monitor's indicating lights are connected in multiple with the operator's lights these monitor's lights need not be specifically mentioned hereinafter.

Let us now assume that the operator of board X will try to pre-empt for his own use the altitude 6 in the central stack CS. He will observe that the green light G for the central stack CS is lighted (see altitude 7, Fig. 1A) which informs him that there is a possibility of setting aside this altitude (see altitude 6) in the central stack for his own use. The operator will therefore in practicing the invention depress push button PB for intermediate zone WI, altitude 6, board X (Fig. 1A) which will result in the lighting of the yellow light Y for intermediate zone WI and will also result in the lighting of the yellow light Y and the red light R for the central stack CS, board X for this altitude, all for reasons heretofore given. Referring now to boards J and Z (Figs. 1B and 1C) it will be observed that this depression of the push button PB for zone WI, board X, also results in the extinguishment of the green light G and the lighting of the red light R for altitude 6 in the central stack on both of the boards J and Z as illustrated in Figs. 1B and 1C of the drawings.

Let us now observe how this green light on the boards J and Z was extinguished and its associated red light was lighted. Referring to Figs. 2B, 2C and 2D of the drawings it will be observed that dropping of the lock relay LR, board X, intermediate zone WI (Fig. 2B) by the opening of its contact 120 not only causes the green lights G on each of the boards X, J and Z for the intermediate zone WI to be extinguished but also causes the three green lights for the boards X, J and Z of the central stack and for the intermediate zone EI to be extinguished, all as is clearly evident from the circuits illustrated in Figs. 2B, 2C, 2D and 7 of the drawings. Attention is particularly directed to Fig. 7 of the drawings which shows, in condensed form, the circuits for lighting the various green lights G.

Referring again to Figs. 1A, 1B and 1C of the drawings it will be observed that the insertion of the operator's token and the monitor's token in their respective token jacks for intermediate zone WI, as conventionally shown for altitude 5 (Fig. 1A) produces no change in the indications given on boards J and Z (Figs. 1B and 1C) but does extinguish the yellow light Y for the intermediate zone WI on board X (see altitude 5, Fig. 1A). This extinguishment of the yellow light Y for intermediate zone WI is brought about by the opening of the contact 132 of the associated mag-stick relay MS (Fig. 2B). The yellow light Y for the central stack is not changed because even though contact 134 on board X (Fig. 2B) is opened the bus wire 31 is now energized through contact 138 of token jack OTJ, board X (Fig. 2B).

Referring now to altitude 4 (Fig. 1A) it will be observed that the removal of the monitor's token alone produces no change of indication on board X (Fig. 1A) but by referring to altitude 3 it will be observed that the removal of the operator's token with the monitor's token retained in his token jack will cause the yellow light at the central stack on board X to be extinguished but produces no change of indication on the boards J and Z (Figs. 1B and 1C). This extinguishment of the yellow light Y on the central stack CS, board X, (altitude 3, Fig. 1A) is due to the fact that the token jack contact 138, board X, intermediate zone WI (Fig. 2B) has been opened and has resulted in the removal of energy from bus wire 31, which had been feeding energy to the yellow light Y on board X of the central stack CS (Fig. 2C) through the contact 132 of its associated mag-stick relay MS. It is this opening of this contact 138 which resulted from the removal of the operator's token but which does not result from the removal of the monitor's token that causes this yellow light Y to be extinguished when one of the tokens is removed but not to be extinguished when the other token is removed. The removal of both tokens, however, results in the extinguishment of the red light on outer stack WO on each of the boards X, J and Z and results in the lighting of the associated green light G (see altitude 2, Figs. 1A, 1B and 1C).

In practice these tokens will not be removed from the intermediate panel WI until the operator has depressed the push button PB for the central stack CS. Such depression of the push button for the same or a different altitude of the central stack CS as has been conventionally illustrated by the solid cross in the push button PB for altitude 2, board X, central stack CS (Fig. 1A). In the present instance the yellow light for the central stack is lighted through a circuit including the contact 132 of the associated mag-stick relay MS assuming its right-hand dotted position (see board X, central stack CS, Fig. 2C). This condition has been conventionally illustrated by the lighting of the yellow light Y following the depression of the push button PB at altitude 2, Fig. 1A of the drawings. If now in response to the pilot's report that he has entered the stack CS both the operator and the monitor insert their tokens in their respective token jacks as illustrated for altitude 1, central stack CS (Fig. 1A) the yellow light just mentioned is extinguished and the associated red light is lighted. No changes of indications on the boards J and Z, however, take place (see altitude 1 as compared with altitude 2, Figs. 1B and 1C). Referring to Fig. 2C this change of indication for the central stack panel board X is brought about by the return of the mag-stick relay MS, board X, central stack CS (Fig. 2C) to its normal position, causing this yellow light Y to again be connected to bus wire 31 which bus wire is now deenergized, the associated red light R being lighted by the reclosure of the contact 136 of this mag-stick relay MS, it being understood that the back contact 135 of the associated lock relay LR is still closed and energizes bus wire 29. The red lights R for this altitude 1 on the other two boards J and Z being maintained lighted through this same back contact 135 because the mag-stick relays MS for boards J and Z for altitude 1 remain in their normal position and these red lights are all connected to this same bus wire 29, for which reason all three of the red lights for altitude 1, central stack CS, boards X, J and Z are lighted.

If now, both of the tokens are removed from their respective token jacks the lock relay LR for board X, central stack CS (Fig. 2C) will be reenergized through its normal circuit heretofore traced and thereby causes opening of its back contact 135 to thereby extinguish the red lights R, altitude GR on all three of the boards X, J and Z (Figs. 1A, 1B, 1C and 2C). Similarly, this picking up of the lock relay LR by the closure of its front contact 117 (Figs. 2C and 7) relights all of the nine operator's green lights and all of the three monitor's green lights for that altitude for zones WI and EI and for central stack CS (Figs. 2B, 2C and 2D).

By referring to Figs. 2A–2E, 6 and 7 it will be observed that all of the circuits shown therein are symmetrical when considered from the extreme two ends of the drawings toward the middle or central stack CS. From this consideration it is obvious that the operations just described which started with outer stack WO and ended with central stack CS would be exactly the same if the airplane had been brought in from the outer stack EO to the central stack CS. The corresponding indicating lights for route portions EO and EI would, of course, have been lighted instead of on the lights of control boards for route portions WO and WI. For this reason it is unnecessary to describe the operation of the system, either by considering only one operator or by considering all three of the operators present, for airplane movements into the central stack through the medium of the outer stack EO.

By referring to Fig. 6 it is readily seen how the various push buttons are electrically interlocked. Not only is a push button accessible by the operator X locked in response to the operation of a push button accessible only to operator J or operator Z but it may in some instances also be rendered ineffective by the operation of another of his own push buttons. First, we must bear in mind that the momentary operation of a push button PB results in the somewhat permanent deenergization of a lock relay LR (Fig. 2A). This is brought about by the operation of a stay-where-put relay, such as the mag-stick relay MS, to its dotted position. This mag-stick relay upon having been operated holds the lock relay energizing circuit open. Referring again to Fig. 6 it will be seen that each push button circuit for the central stack CS (Fig. 6) is subject only to the condition of lock relays for that altitude of the other two operators for the middle stack and to all of the lock relays for the intermediate zones; that each push button circuit for each intermediate zone is subject to the condition of lock relays for that altitude for the other two operators for that intermediate zone and the associated outer stack and is further subject to all lock relays for that altitude for the center stack and all other intermediate zones; and that each push button circuit for each outer stack is subject to the condition of the lock relays for that altitude for the other two operators for that outer stack and to the condition of all lock relays for that altitude for the associated intermediate zone. It is thus seen that a particular operator's own lock relays are only effective to render his own push buttons ineffective in the case where such push buttons are associated with an outer stack or an intermediate zone and not if associated with a center stack. Also, that in the case of an intermediate zone his own lock relay at the central stack and the lock relays of all other intermediate zones can render the push button for that altitude of such intermediate zone ineffective; and that with respect to an outer stack his own lock relay for that particular altitude at the associated intermediate zone is effective to render his push button at such outer stack ineffective.

In each of Figs. 1A, 1B and 1C has been illustrated the control board of a three-unit computer such as disclosed in the prior application Ser. No. 573,876 above referred to. The sections of this computer have been designated A, B and C. Each section is provided with four push buttons PB1, PB2, PB3 and PB4 and with four computer indicating lights $g$, $y$, $r$ and $p$.

Figure 8:
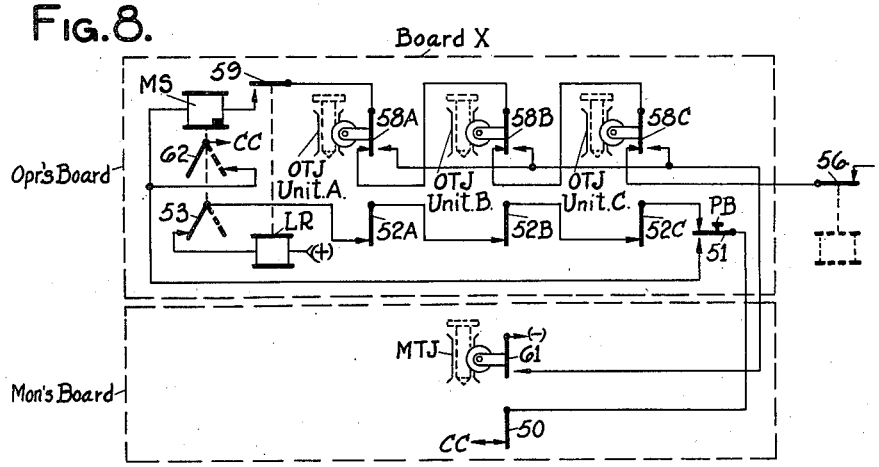
Fig. 8 illustrates how the circuits of Figs. 2A-2E are modified where three token jacks per altitude are used as is the case for altitudes 1, 2, and 3, as shown in Figs. 1A, 1B and 1C.

It will be seen that altitudes 1, 2 and 3 (Figs. 1A, 1B and 1C) are each provided with three token jacks for the central board. This is resorted to to enable the operator, who also operates a portion of the computer shown in application, Ser. No. 573,876 when such a computer is used in practicing the present system, to coordinate a particular airplane not only with a particular operator but also with a particular section of the computer used for landing that airplane. Obviously the use of three token jacks, only one of which is used at any one time, in place of the single jack shown on board X (Fig. 2A), requires a modification in the wiring associated with these token jacks. The necessary modification of these circuits, when three token jacks instead of one are employed, has been shown in Fig. 8. Referring to Fig. 8 it will be seen that contacts 52 and 53 have been triplicated and designated 52A, 52B, 52C, 53A, 53B and 53C. It will be seen that of this group of contacts the normally closed contacts are included in series and that the normally open contacts function in multiple. This is as it should be in that since only one token is used at a time the insertion of such token in any one token jack should open one circuit and complete another circuit.

Radio telephone communication is an important adjunct to the present invention, as is obvious from the foregoing description. For this reason a radio telephone communicating system has been conventionally illustrated by the headphones 140 and the microphone jack 141 in each of Figs. 1A, 1B and 1C of the drawings. In this connection it should be understood that each operator X, J, and Z and his associated monitor employ their own carrier frequency which is distinct from that employed by the other two operators and their respective monitors. Also, since the monitor must not be able to listen in on the operator's conversation suitable means is provided to prevent the operator's voice from being heard in the monitor's earphone or loud speaker. This may be accomplished by carrying the monitor's headphone through a normally closed operator's foot pedal contact, so that each time the operator's microphone is cut into a circuit for use the associated monitor's headphone is cut out. The operators X, J and Z may represent separate airlines assigned specific carrier frequencies or they may be assigned such specific and different carrier frequencies in which case specific pilots will be assigned specific carrier frequencies for landing purposes.

One particular construction of apparatus has now been fully described but it should be understood that this apparatus may be used in various ways depending upon the rules which the operator and monitor must follow during their operation of the apparatus. For instance, these rules may require that airplanes may only change from one altitude to another within a particular stack WO, EO or CS or the rules may permit a change of altitude to be made in flying from one stack to another stack through an intermediate zone such as WI or EI. Also, whether tokens should be inserted in the central stack when the pilot has acknowledged instructions to fly to such central stack or whether such tokens shall be inserted only after the pilot reports arriving at such central stack is a question which depends on the rules then in force. In other words, various kinds of rules may be laid down to the operator and monitor and the system will function slightly differently dependent upon the exact rules laid down for use of the apparatus at that time.

Having thus disclosed one specific embodiment of the present invention and having pointed out how some of the features of this invention may be omitted and how some of the structures may be modified it should be understood that these various disclosures have been shown and described as an example of how the invention may be carried out and it should be understood that the invention is not limited to the particular constructions shown and described but may be modified to meet various conditions encountered in practicing the invention and that various changes, modifications and additions may be made without departing from the spirit or scope of this invention so long as these modifications come within the scope of the following claims.

What we claim as new is:

1. In an airplane dispatching system; an indication board for depicting traffic conditions over a route portion; a three-aspect indicating means on said board for displaying conditions of air traffic; a manually operable device on said board; a token jack on said board; a token identifying an airplane; means for causing said indicating means to normally display one aspect, to display a second aspect until manually changed if said manually operable device is operated momentarily, to display a third aspect if said token is inserted in said token jack, and to display said one aspect when said token is again removed.

2. In an airplane dispatching system; an indication board for depicting traffic conditions over a route portion; a plural-aspect indicating means on said board; means for causing said indication means to normally display one aspect; a manually operable device on said board; a token jack on said board; a token identifying an airplane; means for causing said indicating means to display a second aspect until manually changed if said manually operable device is operated momentarily only and to again display said one aspect if said token is inserted in and then removed from said token jack.

3. In a multiple operator airplane dispatching system, a plurality of indication boards one for each of a plurality of operators for depicting at least a route portion over which all operators may dispatch the movement of airplanes, manually operable devices on each board, indicating devices on each board which are identical at least for that route portion, and means for causing a different indication to be displayed as to the common route portion on various indicating boards depending upon whether the indication is due to the operation of a manually operable device on that board or the operation of a manually operable device on another board.

4. In a multiple operator airplane dispatching system, a plurality of indication boards one for each of a plurality of operators all depicting at least a route portion over which all operators may dispatch the movement of airplanes, manually operable devices on each board, indicating devices on each board which are identical at least for that route portion, and circuit means for causing a different indication to be displayed as to the common route portion on various indicating boards depending upon whether the indication is due to the operation of a manually operable device on that board or the operation of a manually operable device on another board, said circuit means being so constructed that if a manually operable device on one of said boards has been operated the operation of the corresponding device on another board is ineffective.

5. In a multiple operator airplane dispatching system, a plurality of indication boards one for each of a plurality of operators all depicting at least a route portion over which all operators may dispatch the movement of airplanes, manually operable devices on each board, indicating devices on each board which are identical at least for that route portion, and means for causing a different indication to be displayed as to the common route portion on various indicating boards depending upon whether the indication is due to the momentary operation of a manually operable device on that board or the momentary operation of a manually operable device on another board.

6. In an airplane dispatching system; an indication board for depicting traffic conditions over a route portion; a multiple-aspect indicating means on said board, a control button biased to a normal position on said board; a token jack on said board; a token identifying an airplane; means for causing said indicating means to normally display one aspect, to operate a device and leave it in an operated position to result in display of a second aspect if said control button is only momentarily operated, to return said device to normal and cancel said second aspect and display a third aspect if said token is inserted and remains in said token jack.

7. In an airplane dispatching system; an indication board for depicting traffic conditions over a route portion; a multiple-aspect indicating means on said board, a control button on said board; a token jack on said board; a token identifying an airplane; means including a stick device for causing said indicating means to normally display one aspect, to display a second aspect due to the operation of said stick device to an abnormal position if said control button is momentarily operated, to return said stick device to normal to thereby cancel said second aspect and display a third aspect if said token is inserted and remains in said token jack, to also display said third aspect by the insertion of a token in said token jack irrespective of whether said control button was or was not momentarily operated and to return said indicating means to the display of said one aspect upon the removal of the token.

8. In an airplane dispatching system; an indication board for depicting traffic conditions over a route portion; a multiple-aspect indicating means on said board, a control button biased to a normal position on said board; a token jack on said board; a token identifying an airplane; means including a circuit for causing said indicating means to normally display one aspect, to display a second aspect until manually changed if said control button is momentarily operated and then returned to its normal position and to cancel said second aspect and to again display said one aspect if said token is inserted and then removed from said token jack.

9. In an airplane dispatching system; an indication board for depicting traffic conditions over a route portion; a monitor's board for checking the operator of the indication board; a three-aspect indicating means on said indication board; a manually operable device on said indication board; a token jack on each of said boards; tokens identifying an airplane; means for causing said indicating means to normally display one aspect, to display a second aspect until manually changed if said manually operable device is operated momentarily and then returned to its normal condition and to extinguish said second aspect and display a third aspect only if said tokens are inserted and remain in said token jacks.

10. In an airplane dispatching system; an indication board for depicting traffic conditions over a route portion; a monitor's board for checking the operator of the indication board; a plural-aspect indicating means on said indication board; a manually operable device on said indication board; a token jack on each of said boards; two tokens each identifying the same airplane; means for causing said indicating means to display one aspect if said manually operable device is operated momentarily and then returned to its normal position and to extinguish said one aspect and display a different aspect only if said tokens are present simultaneously in both of said token jacks.

11. In an airplane dispatching system; an indication board for depicting traffic conditions over a route portion; a monitor's board for the same route portion; a four-aspect indicating means on said indication board; a manually operable device on said indication board; two token jacks on each of said boards; two tokens identifying the same airplane; means for causing said indicating means to normally display one aspect, to display a second aspect until manually cancelled if said manually operable device is operated momentarily only, to cancel said second aspect and display a third aspect if said tokens are inserted and present in the second token jack on each of said boards and to display a fourth aspect if said tokens are inserted and present in said first token jack on each of said boards.

12. In a multiple operator airplane dispatching system, a plurality of indication boards one for each of a plurality of operators all depicting at least a route portion over which all operators may dispatch the movement of airplanes, a plurality of monitor's boards one for each monitor, manually operable devices on each indication board, indicating devices on each indication board which are identical at least for that route portion, a token jack on each indication board and on each monitor's board, means for causing a different indication to be displayed as to the common route portion on various indicating boards depending upon whether the indication is due to the operation of a manually operable device on that board or the operation of a manually operable device on another board, and means for causing such different indications to be cancelled only if tokens are inserted and removed in the token jacks on that indication board where the manually operable device was operated and on the corresponding monitor's board.

13. In a multiple operator airplane dispatching system, a plurality of indication boards one for each of a plurality of operators all depicting at least a route portion over which all operators may dispatch the movement of airplanes, a monitor's board for each indication board, manually operable devices on each board, indicating devices on each board which are identical at least for that route portion, circuit means for causing a different indication to be displayed as to the common route portion on various indicating boards depending upon whether the indication is due to the operation of a manually operable device on that board or the operation of a manually operable device on another board, said circuit means being so constructed that if a manually operable device on one of said boards has been operated the operation of the corresponding device on another board is ineffective, and means for cancelling said different indications including a token jack on each indication board and a token jack on each monitor's board effective only if tokens are present in the token jacks on the indication board the manually operable means of which was operated and its associated monitor's board and such tokens are then both removed.

14. In an airplane dispatching system; an indication board for depicting traffic conditions over a route portion; a monitor's board for the same route portion; a three-aspect indicating means on said indication board; a manually operable device on said indication board; a token jack on each of said boards; two tokens identifying the same airplane; means for causing said indicating means to normally display one aspect, to display a second aspect if said manually operable device is operated momentarily and then returned to its normal condition, to display a third aspect if one of said tokens is inserted in each of said token jacks so long as they remain therein and to again display said one aspect only if both of said tokens are removed.

15. In a system of the type described, a two-position relay, a manually operable device, a token jack, a token representative of a conveyance, means including a circuit for operating said relay to one position only when said token jack is free of a token and said manually operable device is operated, means for causing the relay to be operated to the other position when a token is inserted in said token jack, and indicating means controlled by said relay.

16. In a system of the type described, a two-position relay, a manually operable device, a token jack, a token representative of a conveyance, means including a circuit for operating said relay from its normal to one position when said token jack is free of a token and said manually operable device is operated, means for causing the relay to be operated back to the normal position and remain therein when a token is inserted in said token jack with said manually operable device assuming its normal position, and indicating means controlled by said relay.

17. In a system of the type described, a two-position relay constructed to remain in the last operated position, a manually operable device, a token jack, a token representative of a conveyance, means including a circuit for operating said relay from its normal to one position when said token jack is free of a token and said manually operable device is operated, means including another circuit for causing the relay to be operated back to its normal position when a token is inserted in said token jack, and indicating means controlled by said relay.

18. In a system of the type described, a two-position relay, a manually operable device, two token jacks, two tokens representative of the same conveyance, means including a circuit for operating said relay to one position when said token jacks are free of tokens and said manually operable device is momentarily operated, means for causing the relay to be operated to the other position only when a token is inserted in each of said token jacks, and indicating means controlled by said relay.

19. In an airplane dispatching system; a manually operable device, two indicators one for each of two adjacent sections of an air route and normally displaying an unoccupancy aspect; a token jack; means including a circuit for causing both of said indicators to display such occupancy aspect if said token jack is free of a token and said manually operable device is momentarily operated, for operating one of said indicators to display a different aspect if a token is inserted in said token jack and for causing the other of said indicators to again display its normal aspect upon removal of such token from said token jack.

20. In an airplane dispatching system; a manually operable device, two indicators normally displaying a normal aspect; two token jacks in the custody of two different attendants; means including a circuit for causing both of said indicators to display a different aspect if both of said token jacks are free of tokens and said manually operable device is operated, for causing one of said indicators to again display its normal aspect if a token is inserted in each of said token jacks and for causing the other of said indicators to again display its normal aspect only upon removal of both of such tokens from said token jacks.

21. In an airplane dispatching system; a manually operable device, a neutral relay, a two-position relay which remains in its last operated position; a token jack, means including a circuit for operating both of said relays from a normal to an operated position if said token jack is free of tokens and said manually operable device is momentarily operated, for operating the two-position relay back to its normal position if a token is inserted in said token jack and for operating said neutral relay back to its normal position upon removal of such token from said token jack.

22. In an airplane dispatching system; a manually operable device, a neutral relay, a two-position relay which remains in its last operated position; two token jacks, means including a circuit for operating both of said relays from a normal to an operated position if said token jacks are free of tokens and said manually operable device is momentarily operated, for operating the two-position relay back to its normal position if tokens are inserted in both of said token jacks and for operating said neutral relay back to its normal position upon removal of both of such tokens from said token jacks.

23. In a system of the type described, a two-position relay, a manually operable device, two token jacks, two tokens each representative of the same conveyance, means including a circuit for operating said relay to one position effective only when both said token jacks are free of tokens and said manually operable device is momentarily operated, means for causing the relay to be operated to the other position effective only if tokens are contained in both of said token jacks simultaneously, and indicating means controlled by said relay.

24. In a multiple operator airplane dispatching system, a plurality of indication boards one for each of a plurality of operators for depicting at least a route portion over which all operators may dispatch the movement of airplanes, manually operable devices on each board, indicating devices on each board which are identical at least for that route portion, means for causing a different indication to be displayed as to the common route portion on various indicating boards depending upon whether the indication is due to the momentary operation of a manually operable device on that board or the momentary operation of a manually operable device on another board, a monitor's board for each operator's board, a token jack on each board, and means for rendering the manually operable device on a particular operator's board ineffective if there is a token in the token jack of that operator's board or there is a token in the token jack of the associated monitor's board or both.

25. Control apparatus to aid in the control of airplanes in a holding stack comprising; an operator's control board depicting a holding stack and including a push button, an indicating lamp and a token jack for each altitude of said stack; a monitor's board depicting a holding stack and including an indicating light and a token jack for each altitude of said stack; means for extinguishing said indicating lamps for a particular altitude in response to the depression of the push button for that altitude by the operator; and means for again illuminating said lamp responsive only if thereafter a token is present in each of the two token jacks for that altitude simultaneously and then only if both of these token jacks are again removed.

26. Control apparatus to aid in the laddering down of airplanes in a holding stack comprising; an operator's control board depicting a holding stack; a push button, a clear lamp, a caution lamp and a token jack for each altitude at which airplanes are authorized to fly in said holding stack; means for normally lighting said clear lamp; means for extinguishing said clear lamp and lighting said caution lamp in response to depression of the push button for that altitude; and means for extinguishing said caution lamp upon the insertion of a token in the token jack for that altitude.

27. Control apparatus to aid in the laddering down of airplanes in a holding stack comprising; a plurality of operators' control boards depicting a holding stack; a push button, a clear lamp, a caution lamp and a token jack for each altitude at which airplanes are authorized to fly in said holding stack for each board; means for normally lighting said clear lamp on all boards; means for extinguishing said clear lamp on all boards and lighting said caution lamp on a particular board in response to depression of the push button for that altitude on said particular board; and means for extinguishing said caution lamp on said particular board upon the insertion of a token in the token jack for that altitude on said particular board.

28. In a multiple operator airplane dispatching system, a plurality of indication boards one for each of a plurality of operators for depicting at least a route portion over which all operators may at times display the presence of airplanes, manually operable devices on each board, indicating devices on each board for displaying various conditions of occupancy, means for causing different indications to be displayed as to the common route portion on the various indicating boards depending upon whether the indication on a particular board is due to the operation of a manually operable device on that board or is due to the operation of a manually operable device on another board, and means for preventing a second operator from changing a display set up by a first operator.

29. In a multiple operator airplane dispatching system, a plurality of indication boards one for each of a plurality of operators for depicting different approach routes all having a common route portion over which all operators may at times display the presence of airplanes, manually operable devices on each board, indicating devices on each board for displaying various conditions of occupancy, means for causing different indications to be displayed on the different approach routes on the various indicating boards depending upon whether the indication on a particular board is due to the operation of a manually operable device on that board or is due to the operation of a manually operable device on another board, and means for preventing a second operator from changing a display set up by a first operator.

30. In a multiple operator airplane dispatching system, a plurality of indication boards one for each of a plurality of operators for depicting different approach routes all having a common route portion over which all operators may at times display the presence of airplanes, a plurality of monitor's boards one for each indication board, manually operable devices on each indication board and on each monitor's board, indication devices on each indication board for displaying various conditions of occupancy, means for causing different indications to be displayed on the different approach routes on the various indication boards depending upon whether the indication on a particular board is due to the operation of a manually operable device on that board and on its associated monitor's board or is due to the operation of a manually operable device on another board or its associated monitor's board, and means for preventing a second operator or his associated monitor from changing the display set up by the first operator and his associated monitor.

31. In a multiple operator airplane dispatching system, a plurality of indication boards one for each of a plurality of operators for depicting a common route portion over which all operators may at times display the presence of airplanes, a plurality of monitor's boards one for each indication board, manually operable devices on each indication board and on each monitor's board, indication devices on each indication board for displaying various conditions of occupancy, means for causing different indications to be displayed on the common route portion on the various indication boards depending upon whether the indication on a particular board is due to the operation of a manually operable device on that board and on its associated monitor's board or is due to the operation of a manually operable device on another board or its associated monitor's board, and means for preventing a second operator or his associated monitor from changing the display set up by the first operator and his associated monitor.

32. In an airplane dispatching system, a plurality of dispatchers' boards each depicting air routes at different altitudes of which at least part of the routes are common to a plurality of boards one for each of a plurality of dispatchers, manually operable devices on said dispatchers' boards, a monitor's board for each dispatcher's board and for each monitor, manually operable devices for each monitor's board, the dispatchers manipulating such manually operable devices on their boards in accordance with the presence of an airplane and/or its progress as reported by their pilots to the respective dispatchers and the monitors manipulating their manually operable devices in accordance with the presence and/or progress of such airplanes as reported by the pilots to the respective associated dispatchers and overheard by the monitor, and indicators on each dispatcher's board controlled by said manually operable devices on the dispatchers and monitor boards and displaying new indications only if corresponding manipulations of said manually operable devices take place on such dispatcher's board and its associated monitor's board.

33. In an airplane dispatching system, a plurality of dispatchers' boards each depicting air routes at different altitudes of which at least part of the routes are common to a plurality of boards one for each of a plurality of dispatchers, manually operable devices on said dispatchers' boards, a monitor's board for each dispatcher's board and for each monitor, manually operable devices for each monitor's board, the dispatchers manipulating such manually operable devices on their boards in accordance with the presence of an airplane and/or its progress as reported by their pilots to the respective dispatchers and the monitors manipulating their manually operable devices in accordance with the presence and/or progress of such airplanes as reported by the pilots to the respective associated dispatchers and overheard by them, indicators on each dispatcher's board controlled by said manually operable devices and displaying new indications only if corresponding manipulations of said manually operable devices take place on such dispatcher's board and its associated monitor's board, and means for preventing a second dispatcher or his associated monitor from changing the display set up by a first dispatcher or his associated monitor.

34. In an airplane dispatching system, a plurality of dispatchers' boards each depicting air routes at different altitudes of which at least part of the routes are common to a plurality of boards one for each of a plurality of dispatchers, manually operable devices on said dispatchers' boards, a monitor's board for each dispatcher's board and for each monitor, manually operable devices for each monitor's board, the dispatchers manipulating such manually operable devices on their boards in accordance with the presence of an airplane and/or its progress as reported by their pilots to the respective dispatchers and the monitors manipulating their manually operable devices in accordance with the presence and/or progress of such airplanes as reported by the pilots to the respective associated dispatchers and overheard by such monitors, and indicators on each dispatcher's board controlled by said manually operable devices and operated to display the presence of an airplane only if corresponding manipulations of said manually operable devices take place on such dispatcher's board and its associated monitor's board and then only if some other dispatcher and his associated monitor have not already displayed the presence or progress of an airplane or the corresponding portion of the air route on their boards.

SEDGWICK N. WIGHT.
OSCAR S. FIELD.
NELSON B. COLEY.

REFERENCES CITED

The following references are of record in the file of this patent:

UNITED STATES PATENTS

| Number | Name | Date |
|---|---|---|
| 2,206,550 | Nordin | July 2, 1940 |
| 655,264 | Nichol | Aug. 7, 1900 |
| 1,765,538 | Nelson | June 24, 1930 |
| 1,719,506 | Field | July 2, 1929 |
| 2,391,991 | Mackey | Jan. 1, 1946 |